(12) United States Patent
Furukawa et al.

(10) Patent No.: US 9,513,188 B2
(45) Date of Patent: Dec. 6, 2016

(54) LOAD ESTIMATION APPARATUS, LASER LIGHT IRRADIATION SYSTEM, AND LOAD ESTIMATION METHOD

(71) Applicants: Takahiro Furukawa, Kanagawa (JP); Daisuke Tezuka, Tokyo (JP)

(72) Inventors: Takahiro Furukawa, Kanagawa (JP); Daisuke Tezuka, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/658,549

(22) Filed: Mar. 16, 2015

(65) Prior Publication Data

US 2015/0260604 A1    Sep. 17, 2015

(30) Foreign Application Priority Data

Mar. 17, 2014  (JP) .................................. 2014-053943

(51) Int. Cl.
*G01B 9/00* (2006.01)
*G01M 11/02* (2006.01)
*B41J 2/47* (2006.01)

(52) U.S. Cl.
CPC .................. *G01M 11/02* (2013.01); *B41J 2/47* (2013.01)

(58) Field of Classification Search
CPC ......... B23K 26/00; B23K 26/043; H04N 1/00; H04N 2201/00; G03B 27/00; G02B 26/00; G01B 11/00; B41J 2/47; G01M 11/02
USPC .................. 356/399–401, 125, 630, 601–614
See application file for complete search history.

(56) References Cited

U.S. PATENT DOCUMENTS

| | | | |
|---|---|---|---|
| 7,477,407 B2 * | 1/2009 | Itoh ......................... | G01B 9/04 356/630 |
| 8,379,204 B1 * | 2/2013 | Cordingley ............ | G01B 11/00 356/399 |
| 2003/0058331 A1 | 3/2003 | Morita | |
| 2011/0096040 A1 * | 4/2011 | Hasegawa .......... | G06K 15/1276 345/179 |

(Continued)

FOREIGN PATENT DOCUMENTS

| | | |
|---|---|---|
| JP | 2012-091224 | 5/2012 |
| WO | WO-2012118104 A1 | 9/2012 |

OTHER PUBLICATIONS

Extended European Search Report dated Dec. 23, 2015.

*Primary Examiner* — Tarifur Chowdhury
*Assistant Examiner* — Isiaka Akanbi
(74) *Attorney, Agent, or Firm* — Harness, Dickey & Pierce, P.L.C.

(57) ABSTRACT

According to an embodiment of the invention, a load estimation apparatus which estimates a load added to a laser light irradiation apparatus is provided. In the load estimation apparatus, a focal length adjustment unit adjusts the focal length in accordance with a distance from a light source to a light irradiation position in a recording medium, the apparatus comprising: an obtaining unit which obtains control data in which the light irradiation position is instructed with a coordinate; an operation amount detection unit which analyzes the coordinate of the control data to detect an operation amount of the focal distance adjustment unit; a load value calculation unit which accumulates load value information of the focal length adjustment unit in response to results of comparing the threshold and the operation amount when the operation amount is detected.

14 Claims, 20 Drawing Sheets

(56) References Cited

U.S. PATENT DOCUMENTS

2012/0162340 A1* 6/2012 Furukawa ............. B41J 2/4753
347/179
2013/0044371 A1 2/2013 Rupp et al.

* cited by examiner

| OPERATION SPEED v | LOAD VALUE P |
|---|---|
| v1 | P1 |
| v2 | P2 |
| v3 | P3 |
| ⋮ | ⋮ |
| vn | Pn |

LOAD ESTIMATION APPARATUS, LASER LIGHT IRRADIATION SYSTEM, AND LOAD ESTIMATION METHOD

TECHNICAL FIELD

The present invention relates to a load estimation apparatus of a laser light irradiation apparatus with a focal length adjustment unit adjusting a focal length.

BACKGROUND ART

A thermosensitive recording medium is used as a label for displaying an article name and an article destination. The thermosensitive recording medium has the property to make colorization in accordance with temperature. For example, on a plastic container used in a factory is affixed a destination (a delivery destination) of the article in a container and a label describing thereon an article name. The thermosensitive recording medium may be used in this label to write a letter and a symbol using a thermal head, etc.

Moreover, the thermo sensitive recording media include those of a rewritable type in which a colorized part may be decolorized by controlling the temperature of the thermal head to a suitable value. For the thermo sensitive recording medium of the rewritable type, the user may perform writing onto and erasure from a label affixed to the container, so that the operability may improve.

FIG. 1 is an exemplary drawing illustrating an exemplary drawing onto a thermo sensitive recording medium used as a label. In this thermo sensitive recording medium 14 are drawn multiple numbers, letters, figures, barcodes, etc. In order to be able to handle complicated letters, etc., when drawing a letter, etc., laser lights are collected by a lens to turn into a spot light. Therefore, for the laser writing device which irradiates the laser to draw on the label when drawing the letter, etc., with the laser, an irradiation position of the laser is controlled such that a stroke such as the letter, etc., is traced with the laser spot light.

FIGS. 2A and 2B are examples of a drawing which explains an exemplary drawing of a letter of "T", which is drawn onto the thermo sensitive recording medium 14. FIG. 2A is an exemplary drawing of a printing apparatus such as a printer illustrated for comparison. "T" is formed by two strokes of a horizontal line and a vertical line. When drawing "T", the laser writing device traces the two strokes with the laser spot light.

FIG. 2B is a drawing illustrating an example of sets of a starting point and an ending point of a stroke (s1, e1), (s2, e2). The laser writing device adjusts the position of the spot light with a galvano mirror, for example, to move the irradiation position to s1 without irradiating the laser. Next, the irradiation of the laser is started (may be described merely as "laser ON" below) to move the spot light from s1 to e1.

Next, the laser writing device stops the irradiation of the laser (may be described merely as "laser OFF" below) to move the irradiation position to s2 without irradiating the laser. Next, the irradiation of the laser is started to cause the spot light to be moved from s2 to e2. In this way, two strokes are drawn and the letter of "T" is drawn onto the thermosensitive recording medium 14.

In this way, when the intended letter, etc., is formed onto the thermo sensitive recording medium 14, the laser writing device performs control with a command such as "turn the laser ON from a certain position to another position to move the spot light". (a) in FIG. 3 is an example of a letter and a figure to be drawn, while (b) in FIG. 3 is an example of a scan instruction used by the laser writing device. The scan instruction means the content below in order from the left.

ln: line number (stroke number)
W: ON/OFF of laser ("1" is ON and "0" is OFF)
Sp: Coordinates of starting point
Ep: Coordinates of ending point
Pw: Output of the laser
Ve: scan speed For the coordinates, what specifies the lateral position is handled as X, what specifies the vertical position is handled as Y, and the coordinates are shown as (X,Y). X increases in value when the position is closer to the right, while Y increases in value when the position is closer to the top. How the coordinate point is taken is one example. An example of the scan instruction is not limited to what is shown in FIG. 3.

Such a laser writing device may be used for forming an article name or a destination of an article for conveying the articles to sort the conveyed articles in a factory, distribution center, etc., so that it may be used in forming the article name, and the destination of the article. More specifically, the thermo sensitive recording medium 14 is pasted to the container which is successively conveyed by the conveyor within the factory, so that writing of the destination or the article name is performed with a laser on the individual thermo sensitive recording medium 14.

Here, the content drawn to the thermo sensitive recording medium 14 may always be fixed for an arbitrary period, or may be replaced for each writing target. The content to be drawn is often managed and controlled by an image processing apparatus which communicates with the laser writing device via an Ethernet card (registered trademark), RS-232C, etc. The image processing apparatus is configured with a PC (Personal Computer), for example. Moreover, the laser writing device itself can also manage the drawing content.

Here, as the manufacturer and the user of the laser writing device, the life of the laser writing device may be estimated. This is because, when the writing is continued even when the life has elapsed, failures such as the article name, etc., not accurately drawn could occur.

Thus, a method is devised of calculating life of a galvano mirror mounted on a laser processing apparatus for a user, etc., to grasp the time of replacing the galvano mirror (see Patent document 1, for example). Patent document 1 discloses a laser processing apparatus which calculates the period up to reaching end of life from the number of turns, or the operating time of a galvano mirror with a sensor installed on the galvano mirror.

However, in the laser writing device, a component having a life other than the galvano mirror is used. For example, in order to perform scanning with a laser light to efficiently heat the thermosensitive recording medium 14, the laser writing device needs to adjust the focal length such that the focal point of the laser light irradiated from the light source matches the writing position of the thermo sensitive recording medium 14.

FIG. 4 is one example of a drawing which describes adjustment of a focal length. In FIG. 4, a laser light is irradiated via a focal length adjustment unit 26 for a center vicinity P1 of the thermo sensitive recording medium 14 and an end part P2 of the thermo sensitive recording medium 14.

In order to efficiently heat the thermosensitive recording medium 14 with the laser light, it is preferable for the focal length adjustment unit 26 to adjust the focal point of the laser light to be in the vicinity of the drawing face of the thermo sensitive recording medium 14. The distance from the light source (FIG. 4 shows the distance from the focal length adjustment unit 26 for convenience) largely differs between the distance r1 in the center vicinity P1 and the distance r2 in the end part P2. In this way, the focal length adjustment unit 26 may optimally maintain the focal length when heating at positions whose distances from the light source differs.

Now, the focal length adjustment unit 26 is consumed (worn out) by operating repeatedly, so that it is preferable for a user or a manufacturer to replace it, before the focal distance adjustment unit 26 fails, with a new one, in order to normally form an article name, etc., in the laser writing device. Therefore, a method of estimating life of the focal distance adjustment unit 26 which can grasp the replacement time of the focal distance adjustment unit 26 is desired.

On this point, Patent document 1 does not disclose a technique of estimating a life of a focal length adjustment unit. Moreover, there is a problem that, when an angular sensor, etc., is installed in a focal length adjustment unit, not in a galvano mirror, the reversed times and the operation time are measured with the installed angular sensor, so that how long will be the life of the focal length adjustment unit may not be estimated unless the laser processing apparatus actually operates. Furthermore, as a problem associated with the fact that the angular sensor is installed in the focal length adjustment unit, there are also possibilities which lead to reduction in performance, such as the prolonged drawing time of the laser light irradiation apparatus.

Patent Document

Patent Document 1: JP2012-091224A

DISCLOSURE OF THE INVENTION

According to an embodiment of the invention, there is a load estimation apparatus which estimates a load added to a laser light irradiation apparatus, wherein a focal length adjustment unit adjusts the focal length in accordance with a distance from a light source to a light irradiation position in a recording medium, comprising: an obtaining unit which obtains control data in which the light irradiation position is instructed with a coordinate; an operation amount detection unit which analyzes the coordinate of the control data to detect an operation amount of the focal distance adjustment unit; a load value calculation unit which accumulates load value information of the focal distance adjustment unit in response to results of comparing a threshold and the operation amount when the operation amount is detected.

The present invention makes it possible to provide a load estimation apparatus which can estimate the life of the focal length adjustment unit without using the sensor.

BRIEF DESCRIPTION OF THE DRAWINGS

Other objects, features, and advantages of the present invention will become more apparent from the following detailed descriptions when read in conjunction with the accompanying drawings, in which.

BEST MODE FOR CARRYING OUT THE INVENTION

Below embodiments of the present invention are described with reference to the drawings. The terms used in the present embodiment are described.

"Print information" means information which forms at least one letter, symbol, number, or figure which is drawn onto an article to be printed on.

"Article to be printed" means thermo sensitive paper, thermo sensitive recording medium (rewritable paper), etc., that are affixed to the container, etc.

"Print", "draw", or "record" means forming print information as visual information to be printed on an article to be printed on. It is not always necessary to be visibly recognizable by the naked eyes, so that it may be visualized with a chemical stimulus or a physical stimulus such as ultra violet rays.

"Laser writing device" is an apparatus which performs "print", "drawing", or "recording" of print letter on an article to be printed on.

EXAMPLE 1

Exemplary Configuration

Figure 5:
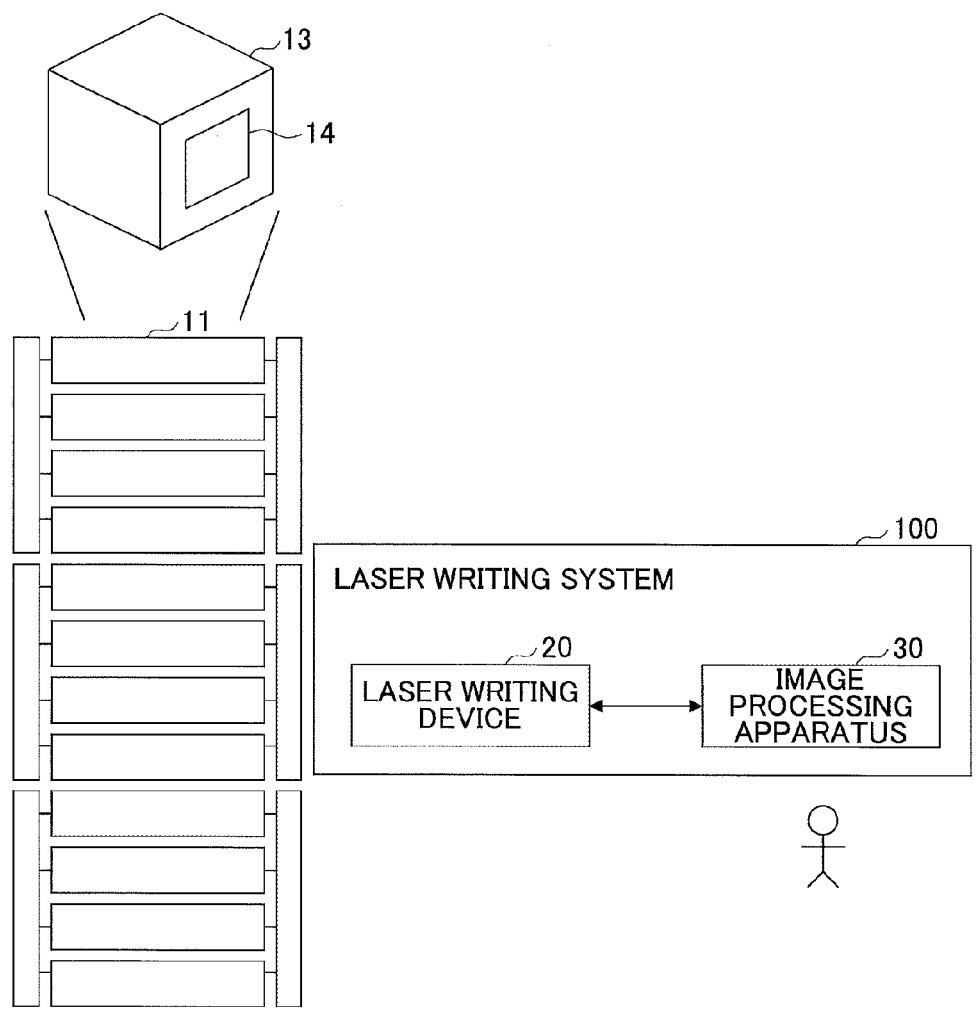
FIG. 5 is an exemplary diagram for explaining an overview of a laser writing system.

FIG. 5 is an exemplary diagram for explaining an overview of a laser writing system 100. The laser writing system 100 includes a laser writing device 20 and an image processing apparatus 30. The laser writing device 20, or the laser writing device 20 and the image processing apparatus 30 may be called a laser marker.

As shown, a container 13 moves on a conveyor 11. The container 13 holds the thermo sensitive recording medium 14 such that it can mount (fix), paste, attach, or detach. The thermo sensitive recording medium 14 onto which a destination, etc., are drawn is recognized by a label by a party involved. The laser writing device 20 is arranged on a position which faces the thermo sensitive recording medium 14 in the conveying path which forms the conveyer 11. The laser writing device 20 detects passing of the container 13 and draws the destination, etc., on the thermo sensitive recording medium 14.

The image processing apparatus 30 creates a scanning instruction from print information. The print information is held by the image processing apparatus 30 and an external apparatus. When the container 13 reaches the front face of the laser writing device 20, a laser light is irradiated onto the thermosensitive recording medium 14 of the container 13 onto a destination, etc.

Multiple of the laser writing system 100 may be arranged. In this case, multiple laser writing devices 20 may simultaneously draw on the thermosensitive recording medium, so that drawing time may be shortened. Moreover, the multiple laser writing devices 20 may be arranged for one image processing apparatus 30.

The laser writing device 20 and the image processing apparatus 30 are connected by wired or wireless means. They may be connected via a network such as a LAN, etc., or by serial communications. The laser writing device 20 may be obtained by a scan instruction generated by the image processing apparatus 30 without necessarily being connected. For example, the scan instruction may also be transferred via a recording medium. Moreover, the laser writing device 20 and the image processing apparatus 30 may be configured as an integral apparatus. In other words, the illustrated embodiment is only one example.

FIGS. 6A-6E are exemplary diagrams for explaining an exemplary arrangement of a life estimation apparatus 40. The life estimation apparatus 40 is an apparatus which estimates life of a focal distance adjustment unit 26 from a scan instruction. Therefore, the life estimation apparatus 40 may be realized by including a function of a general information processing apparatus and referring to the scan instruction.

Figure 6A:
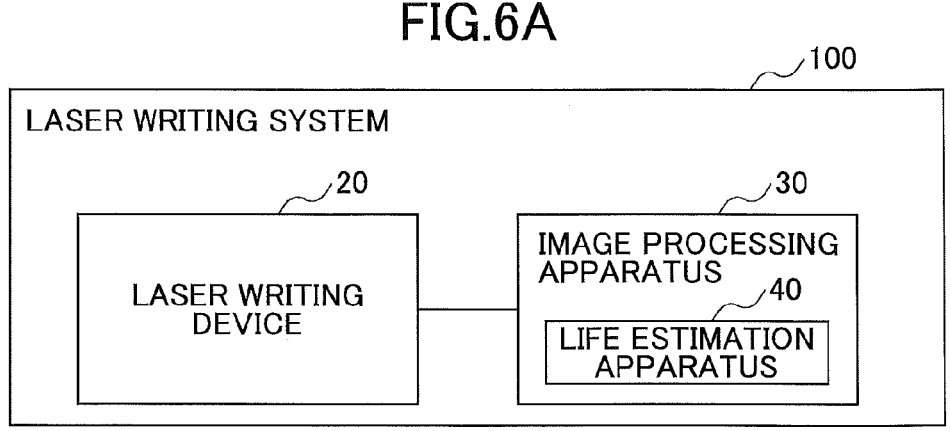
FIGS. 6A to 6E are exemplary diagrams for explaining an exemplary arrangement of a life estimation apparatus.

In FIG. 6A, the life estimation apparatus 40 is arranged inside the image processing apparatus 30. In this case, the life estimation apparatus 40 may estimate life from a scan instruction created by the image processing apparatus 30.

Figure 6B:
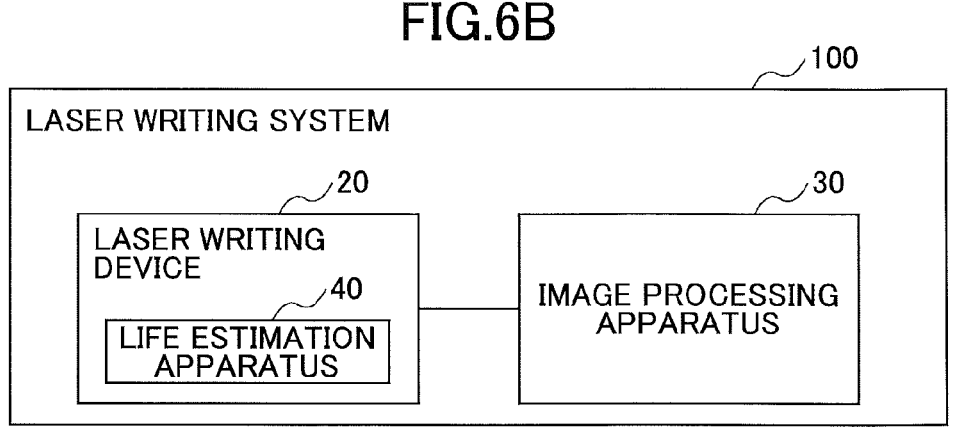

In FIG. 6B, the life estimation apparatus 40 is arranged inside the laser writing apparatus 20. In this case, the life estimation apparatus 40 may estimate the life from a scan instruction used for drawing by the laser writing device 20.

Figure 6C:
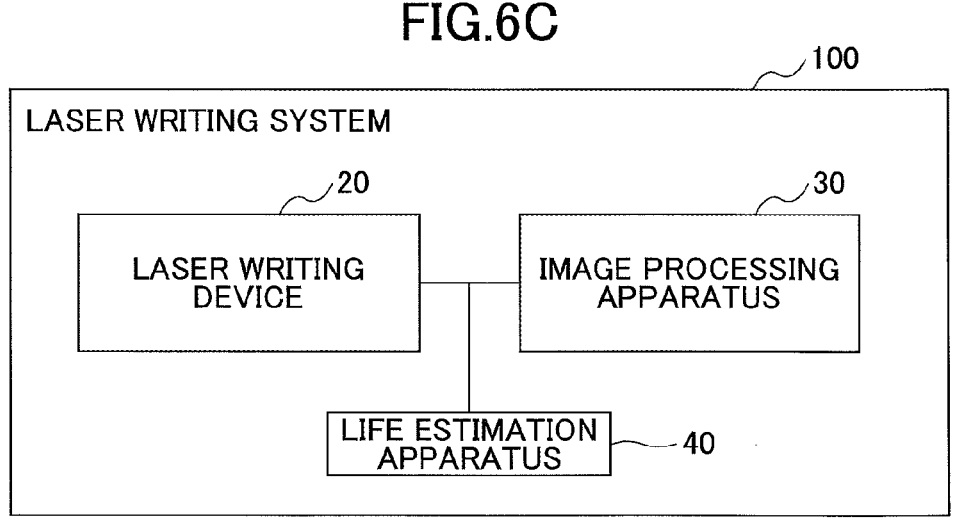

In FIG. 6C, the life estimation apparatus 40 is arranged inside the laser writing system. In other words, the life estimation apparatus 40 is arranged from the laser writing device 20 and the image processing apparatus 30 within the laser writing system 100. In this case, the life estimation apparatus 40 may estimate the life from a scan instruction used for drawing by the laser writing device 20 or a scan instruction created by the image processing apparatus 30.

Figure 6D:
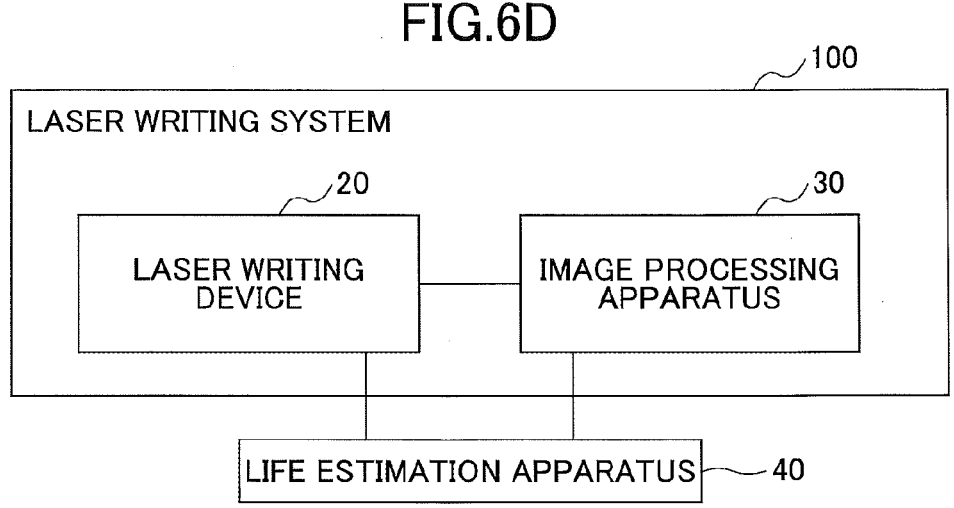

In FIG. 6D, the life estimation apparatus 40 is arranged outside the laser writing system 100. The life estimation apparatus 40 is connected in a wired or wireless manner with at least one of the laser writing device 20 and the image processing apparatus 30. The network may be connected via the LAN via the LAN, etc., or by serial communication. In this case, the life estimation apparatus 40 receives a scan instruction from the laser writing device 20 or the image processing apparatus 30 to estimate the life. Moreover, the life estimation apparatus 40 may be built as a server even when connected via a network. The life estimation apparatus 40 may estimate the life in response to a request from the laser writing device 20 or the image processing apparatus 30.

Figure 6E:
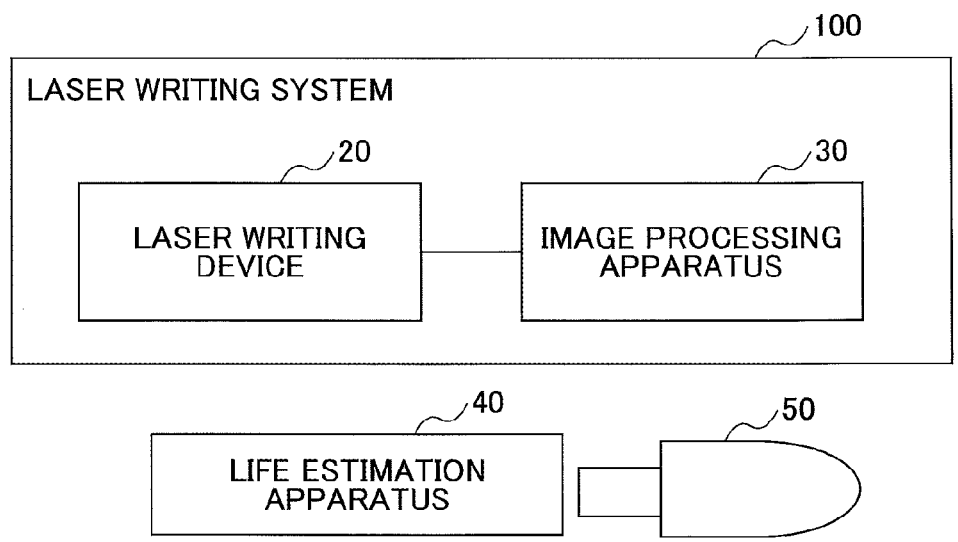

In FIG. 6E, the life estimation apparatus 40 is arranged without being connected to the laser writing system 100. At least one of the image processing apparatus 30 or the laser writing device 20 and the life estimation apparatus 40 includes a mounting interface for an external memory 50. In this case, the life estimation apparatus 40 reads, from the external memory 50, a scan instruction copied to the external memory 50 from the image processing apparatus 30 or the laser writing device 20 by a service person, for example.

Figure 7:
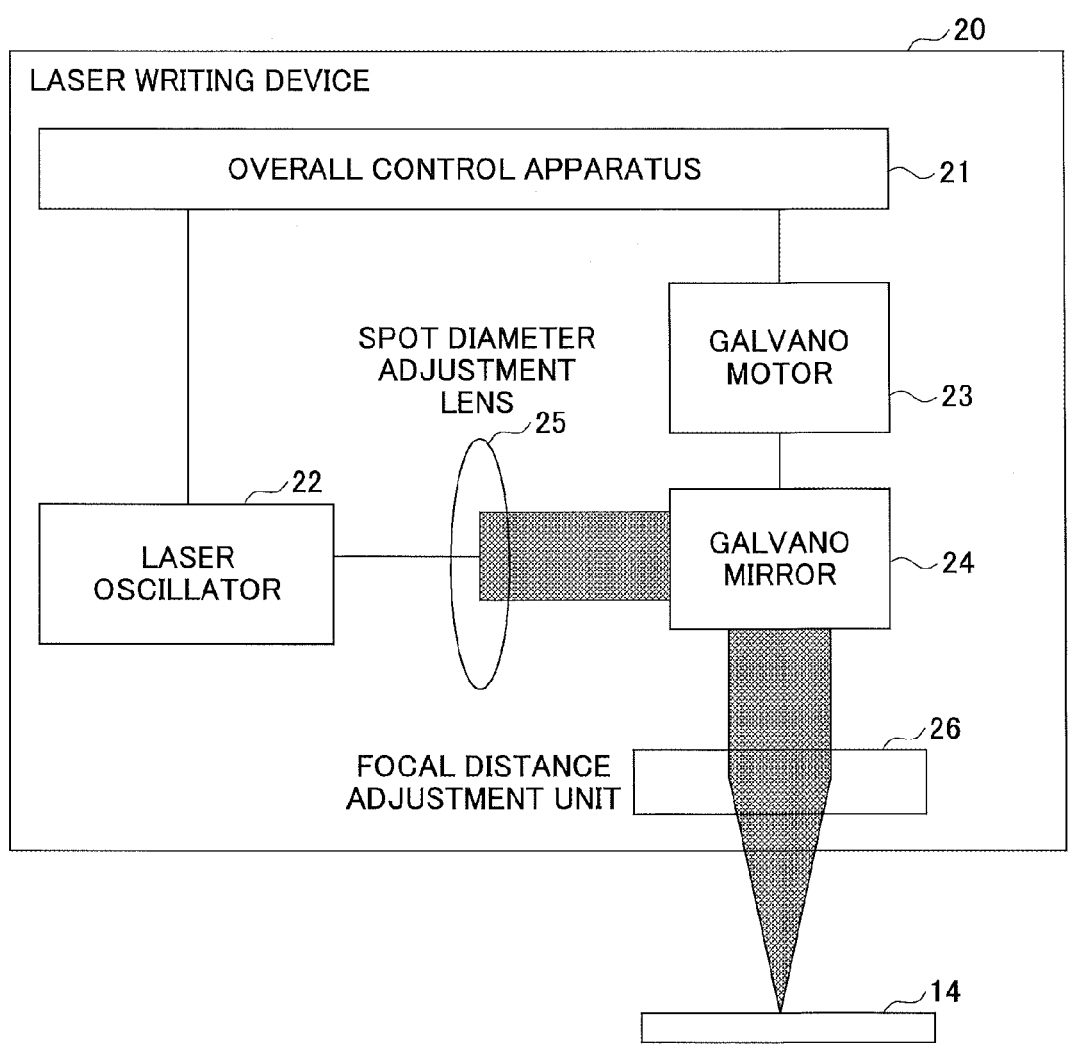
FIG. 7 is an exemplary hardware configuration of the laser writing device.

FIG. 7 illustrates one example of a hardware configuration diagram of the laser writing device 20. The laser writing device 20 includes an overall control apparatus 21, a laser oscillator 22, a galvano motor 23, a galvano mirror 24, a spot diameter adjustment lens 25, and a focal length adjustment unit 26. FIG. 7 shows a major configuration and may include a configuration other than what is illustrated.

The overall control apparatus 21 controls the overall laser writing device 20 such as a substrate mounted to the laser writing device 20, a CPU of the laser writing device 20, for example. The overall control apparatus 21 includes an interface with the image processing apparatus 30.

The laser oscillator 22 is a semiconductor laser (LD (laser diode)); for example, it may be a gas laser, a solid laser, a liquid laser, etc. The galvano motor 23 is a servo motor, for example, which controls, to two axes, an orientation of a reflection face of the galvano mirror 24. The galvano mirror 24, which is one example of a direction control mirror, may be a mirror whose orientation may be controlled. For example, it may be an MEMS (micro electro mechanical systems) mirror, etc.

The spot diameter adjustment lens 25 is a lens for increasing the spot diameter of a laser light, while the focal length adjustment unit 26 is a lens for focusing the laser light to adjust the focal length. The focal length adjustment unit 26 adjusts the focal length in response to the distance from the laser light irradiation position on the thermosensitive recording medium from the laser oscillator 22 as the light source. The location of the laser oscillator 22 is fixed, so it may be expressed that the focal distance be adjusted in accordance with the distance from the laser writing device 20.

The thermo sensitive recording medium 14 is made up of four layers of a protection layer; a recording layer made up of a thermal reversible film; a base material layer; and a back coat layer, for example, from the surface to the depth direction. The thermosensitive recording medium 14, which may be configured to include some strength property at the same time as flexibility, may be used repeatedly. The thermo sensitive recording medium 14, which may be called photosensitive paper, may not include plant fiber, rather than creating a plant fiber.

In the thermo sensitive recording medium 14, a reversible display area is provided as a rewritable reversible display area in a part thereof. Such a thermo sensitive recording medium 14 is called rewritable paper. The rewritable display area is configured by a reversible thermo sensitive recording medium such as a thermal reversible (Thermo-Chromic) film, etc. In the reversible thermosensitive recording medium are included a mode in which a color tone reversibly changes in dependence on temperature and a mode in which the transparency reversibly changes in dependence on temperature.

According to the present embodiment, a reversible recording medium which reversibly changes the color tone in dependence on the temperature includes Royko dye and a developer in a recording layer to implement a rewritable property.

In other words, colorization is performed by heating from the decolorized state to at least a melting point (for example, approximately 180 degrees C.) and rapidly cooling from the fusion state in which the Royko dye and the developer are mixed. In this case, the state is one in which the dye and the developer cohere while they are coupled and collect in a regular manner, so that the colorized state is fixed.

On the other hand, the decolorization is performed by reheating the colorization state to a temperature (for example, 130 to 170 degrees C.) at which no melting occurs. In this case, the collected state of colorization is undermined, and the developer merely crystallizes and separates on its own to turn to the decolorization state. The Royco dye is a colorless or light-colored dye precursor, and is not specifically restricted, so that it may be appropriately selected from within what are known in the related art.

Colorization includes development of a shape which can be visually recognized including color information and development of a shape which does not include color information. For example, it includes a white thermosensitive recording medium 14 changing to black, and a black thermosensitive recording medium 14 changing to white.

Moreover, a thermosensitive recording medium 14, for example, does not have to be writable, so that it may be a thermo sensitive recording medium of the write once type (once drawn, the content drawn cannot be erased).

While the thermosensitive recording medium 14 is, for example, a size A4, the size of the thermosensitive recording medium 14 may be appropriately designed.

Focus Length Adjustment Unit

Figure 8:
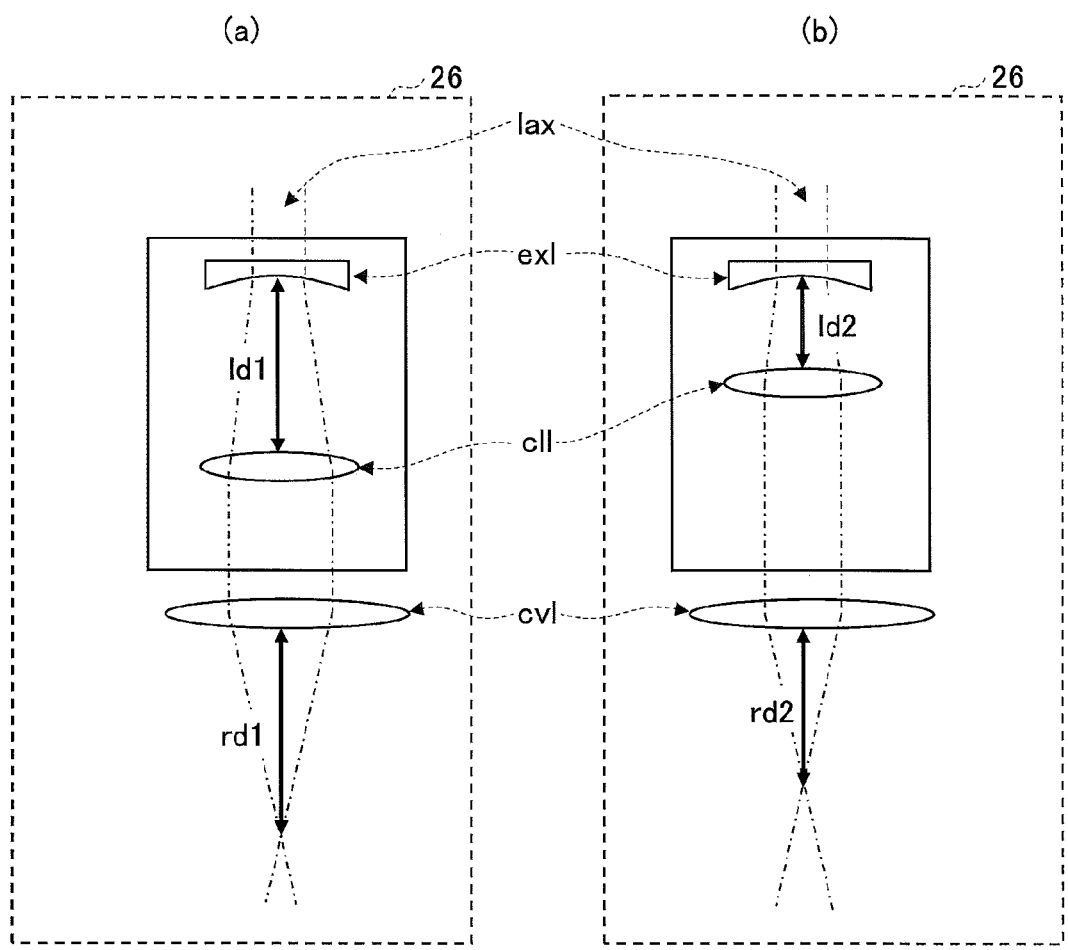
FIG. 8 is an exemplary configuration diagram of a focal point adjustment unit.

Next, the focus distance adjustment unit 26 is described using (a) and (b) in FIG. 8. (a) in FIG. 8 is an exemplary configuration diagram of the focal length adjustment unit 26, while (a) in FIG. 8 shows that the focus distance adjustment unit 26 is adjusted to the long focal length rd1 and (b) in FIG. 8 shows that the focal length adjustment unit 26 is adjusted to the short focal length rd2.

The focal length adjustment unit 26 includes a lens system in which is arranged, in the optical axis direction, an expansion lens ex1, a collimator lens c11, and a convergent lens cv1, etc. Moreover, the focus length adjustment unit 26 includes a mechanism (not shown) not shown that moves, in the optical axial direction, at least any one of the expansion lens ex1, the collimator lens c11, and the convergent lens cv1. This mechanism controls the position of any of the lenses to control the focal length.

FIG. 8 includes the collimator lenses c11 in an optical axis direction and distances 1d1 and 1d2 from the expansion lens 25 ex1 to the collimator lenses c11 to adjust focal lengths rd1 and rd2 from convergent lenses cv1.

The configuration of the focal distance adjusting unit 26 is not limited to FIG. 8, so that FIG. 8 is one example.

Figure 9A:
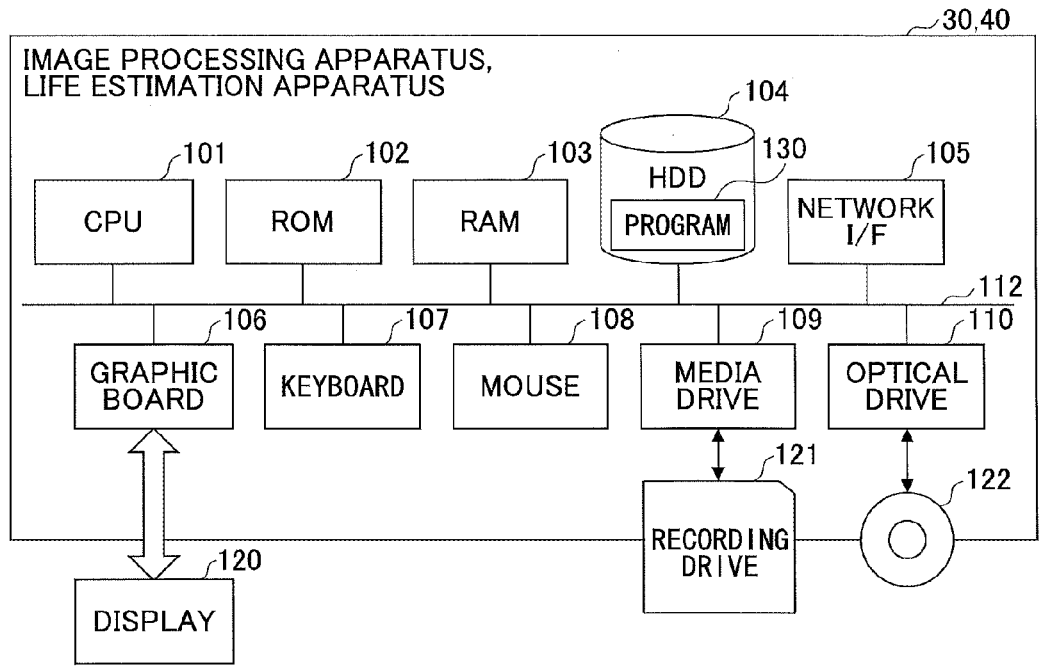
FIGS. 9A to 9B are exemplary hardware configurations of the image processing apparatus and a hardware configuration of the image processing apparatus.

FIG. 9A illustrates one example of a hardware configuration diagram of the image processing apparatus 30. The hardware configuration of the life estimation apparatus 40 is also the same as the image processing apparatus 30.

The image processing apparatus 30 may use a general information processing apparatus. While a personal computer, a work station, a tablet PC, etc., are known for the information processing apparatus, the information processing apapratus may be called by any name.

The image processing apparatus 30 includes a CPU 101, a ROM 102, a ROM 103, an HDD 104, a network I/F 105, a graphic board 106, a keyboard 107, a mouse 108, a media drive 109, and an optical drive 110. The CPU 101 executes a program 130 which is stored in the HDD 104 to control the overall operation of the image processing apparatus 30. The ROM 102 stores the IPL (Initial Program Loader) and static data. The RAM 103 uses, as a work area for executing the program 130 in the CPU 101.

In the HDD 104 is stored the OS and the program 130 executed by the CPU 101. The program 130 is a program for causing the image processing apparatus 30 to generate a scan instruction from shape information such as a vertex, a grid line, etc., of a figure. The network I/F 105 is an Ethernet card (registered trademark), for example, for connecting to the network, and mainly provides the process of layers 1 and 2. The process of layer 3 and above is provided by the program and the protocol stack of the TCP/IP included in the OS.

The graphic board 106 interprets a drawing command written to the video RAM by the CPU 101 to display various information sets such as a window, a menu, a cursor, a letter, an image, etc., to the display 120.

The keyboard 107 includes multiple keys for letters, numerical values, various instructions, etc., and reports the operation of the user to the acceptance CPU 101. Similarly, the mouse 108 accepts the operation of the user such as movement of the cursor, selection to be the process such as a menu, the processing content, etc.

The media drive 109 controls reading or writing (storage) of data with the recording media 121 of the flash memory, etc. The optical drive 110 controls reading or writing of various data sets to the optical media 122 of the CD-RW, DVD-RW, etc., of one example of a detachable recording medium. Moreover, the above-described respective constituting elements include a bus line 112 for an address bus, a data bus, etc., for electrically connecting to the respective constituting elements.

The program 130 is recorded to an optical medium 122 or a computer-readable recording medium 121 in a file in an executable format or an installable format. Moreover, the program 130 may be distributed to the image processing apparatus 30 in a file in an executable or installable format from a server (not shown).

Figure 9B:
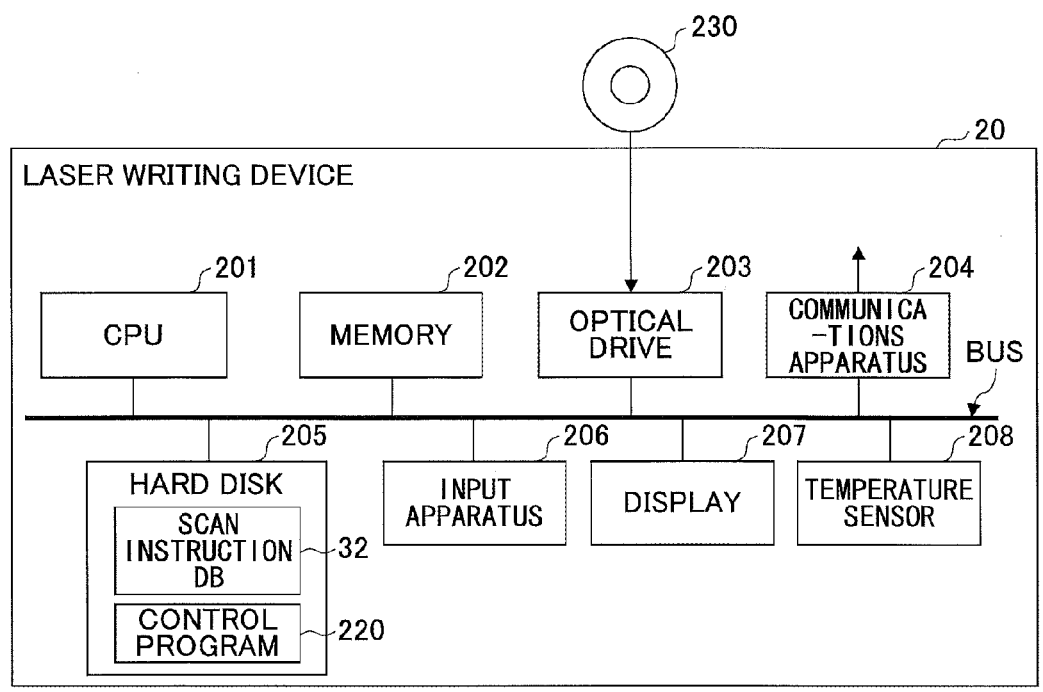

FIG. 9B illustrates one example of a hardware configuration diagram of the laser writing device 20. FIG. 9B is a hardware configuration diagram when an overall control apparatus 21 of the laser writing device 20 is mainly implemented by software, and has a computer as an entity. When the overall control apparatus 21 of the laser writing device 20 is implemented without having the computer as the entity, the IC generated for the specific function such as an ASIC (Application Specific Integrated Circuit), etc., may be used.

The laser writing device 20 includes a CPU 201, a memory 202, an optical drive 203, a communications apparatus 204, a hard disk 205, an input apparatus 206, a display 207, and a temperature sensor 208. In the hard disk 205 is stored a control program 220 which controls the direction control motor 23 and the laser oscillator 22 based on the scan instruction, and the scan instruction DB 32 in which is registered a scan instruction which draws a figure, a symbol, a number, and a letter.

The CPU 201 reads, from the hard disk 205, the control program 220, executes the read control program 220, and draws the letter onto the thermosensitive recording medium 14. The memory 202, which is a volatile memory such as a DRAM, etc., is to be a work area when the CPU 201 executes the control program 220. The input apparatus 206 is an apparatus for the user to input an instruction which controls the laser writing device 20 such as a mouse, a keyboard, etc. The display 207 is to be a user interface which displays a GUI (graphical user interface) screen with a predetermined resolution and the number of colors based on screen information which instructs a control program 220, for example. For example, a column for inputting a letter to be drawn onto the thermo sensitive recording medium 14 is displayed.

The optical drive 203, which is configured to be able to detach a recording medium 230 therefrom and attach the recording medium 230 thereto, reads data from the recording medium 230 and writes data into the recording medium 230. The control program 220 is delivered in a state such that it is stored in the recording medium 230, read from the recording medium 230, and installed into the hard disk 205. The control program 220 may be downloaded from a predetermined server which is connected via a network.

The recording medium 230 is a portable non-volatile memory which can be attached to and detached from, such as a DVD-ROM, a blue-ray disk, an SD card, a multimedia card, an xD card, etc. The communications apparatus 204, which is the Ethernet card (registered trademark), serial communications apparatus (USB) (Universal Serial Bus), IEEE 1394, Bluetooth (registered trademark), etc., is used for receiving a scan instruction from the image processing apparatus 30.

The temperature sensor 208 measures an environment temperature of the laser writing device 20, which is periodically detected, and output to the CPU 201.

As For Function Of Life Estimation Apparatus

Figure 10:
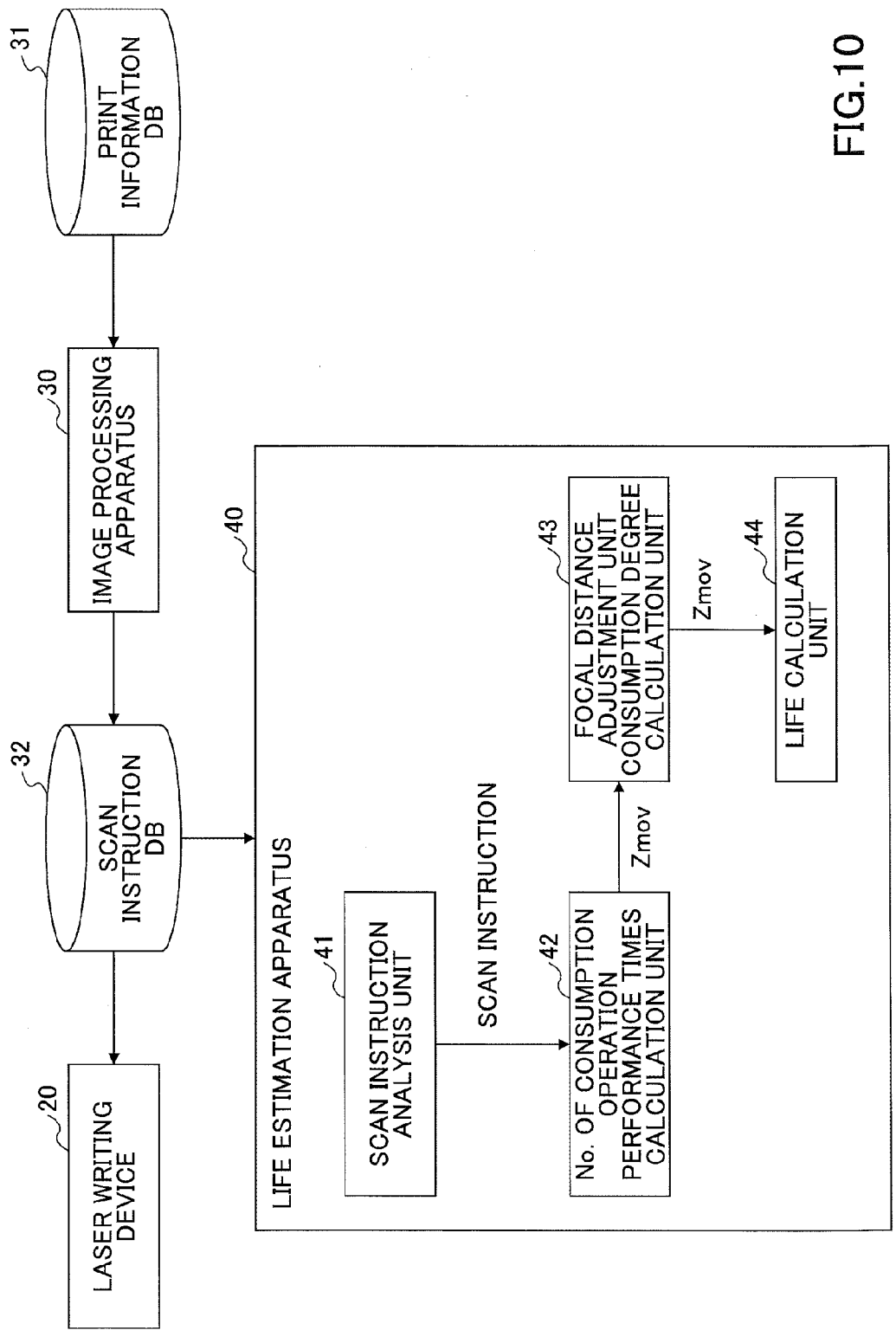
FIG. 10 is an exemplary functional block diagram of a life estimation apparatus.

FIG. 10 is an exemplary functional block diagram of the life estimation apparatus 40. The image processing apparatus stores the print information stored in the print information DB 31 into a scan instruction to store the converted results in the scan instruction DB 32. As the print information is shape information of the shape and the letter code, it is converted to a scan instruction of at least one line segment. The laser writing device 20 irradiates a laser light based on a scan instruction created by the image processing apparatus 30. Moreover, the life estimation apparatus 40 analyzes the scan instruction to estimate the life. As for the scan instruction, it was described in FIG. 3. The scan instruction is one example of control data in the claims.

Life Estimation Apparatus

The life estimation apparatus 40 includes a scan instruction analysis unit 41, the no. of consumption operation performance times calculation unit 42, the focal distance adjustment unit consumption degree calculation unit 43, and the life calculation unit 44.

The scan instruction analysis unit 41 reads, in order, one label scan instruction from the scan instruction DB 32 to output the read results to the consumption operation performance times calculation unit 42.

The consumption operation performance times calculation unit 42 calculates the difference between the distance between the reference point and the end point of one line segment (one scan instruction) and the difference between the reference point and the end point of the other one. The larger the difference in distance, the larger the operation amount of the focal length adjustment unit 26. The reference point is described below. The consumption operation performance unit 42 determines whether this difference is larger than the threshold.

When the focal distance adjustment unit consumption calculation unit 43 has the difference which is larger than the threshold, it is determined that the focal length adjustment unit 26 has performed the consumption operation to calculate the predetermined load value to the focal length adjustment unit consumption operation times. Moreover, the focal length adjustment unit consumption calculation unit 43 determines the load value in accordance with the scan speed of the laser light and posts the determined results as the focal distance adjustment unit number of consumption operation times. In other words, the load value in response to the scan speed is posted as the focal distance adjustment unit performance operation number of times. The focal distance adjustment unit number of consumption operation times is a load value which is added to the focal length adjustment unit 26.

Based on the load value of the upper limit of the adjustment distance adjustment unit 26 and the focal length adjustment unit consumption operation times calculated by the focal length adjustment unit consumption calculation unit 43, the life calculation unit 44 estimates the life of the focal length adjustment unit.

As for coordinate of scan instruction used in estimation of life

Let us assume that the coordinate of the scan instruction which is referred to by the life estimation apparatus 40 according to the present embodiment is a coordinate specified by the position (laser ON) which irradiates all laser lights. In the example in FIG. 3, the "W" is the coordinate of "1 (on)". This is because, when the laser light is irradiated, the focal length adjustment unit 26 adjusts the focal point. Therefore, the scan instruction ("W" is the scan instruction of "0 (off)") which causes to perform scanning onto the coordinate with the laser light without the laser light being irradiated is not used in estimation of life.

Figure 11:
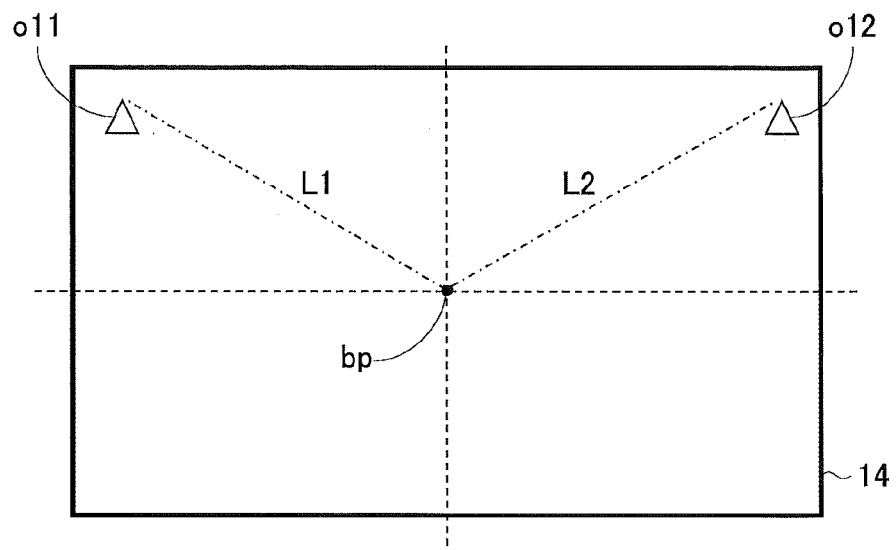
FIG. 11 is an exemplary diagram for explaining operation of a focal length adjustment unit and a distance from a reference point to an irradiation distance when scanning a thermo sensitive recording medium.

FIG. 11 is an exemplary diagram for explaining an operation of the focal length adjustment unit 26 and a distance from a reference point to an irradiation object when scanning the thermo sensitive recording medium 14. First, the used letter is described.

bp: reference point

Object o11, object o12: an object drawn with laser light

Distance L1: a distance from reference by to object oil

Distance L2: a distance from reference point by to object o12

For example, for the reference point by of FIG. 11 may be set a point having the shortest focal distance adjusted by the focal length adjustment unit 26, for example. For example, it is a point having the shortest distance from the light source and the thermosensitive recording medium 14, or in other words, the center part of the thermosensitive recording medium 14. Moreover, the focal distance adjusted by the focal length adjustment unit 26 may be set. Furthermore, the life projection apparatus 40 of the present embodiment may be set such that the estimation of life is facilitated.

When the distance from the light source to the irradiation position of the laser light changes, the focal length adjustment unit 26 adjusts the focal point to the irradiating position (the vicinity of the colorized part of the thermo sensitive recording medium). For example, after a laser light is irradiated to the object oil in FIG. 11, the laser light is to be irradiated to the object o12. In the thermosensitive recording medium 14, while the distance between the object oil and the object o12 largely differs, the distance L1 from the reference point by to the object oil and the distance L2 from the reference point by to the object o12 are almost the same.

During the time the laser writing device 20 perform scanning with the laser light from the object oil to the object o12, the laser light is irradiated, so that the galvano mirror changes the irradiation position of the laser light.

Here, as the timing at which the focus length adjustment unit 26 aligns the focal length, it may be limited to when the laser light is irradiated, so that generally during the time scanning is performed from the object oil to the object o12 without irradiating the laser light, the focal length is not adjusted. In other words, the focal distance adjustment unit 26 adjusts the focal distance when irradiation of a laser light onto the object o12 is started and when irradiation of laser light onto the object oil that is a timing of adjusting the focal length is completed. However, as described above, as the two distances (L1, L2) are almost the same, the focal length adjustment unit 26 does not need to adjust the focal length before drawing the object o12.

Therefore, for the coordinate onto which scanning is performed without irradiating the laser light, it is not necessary for the scan instruction analysis unit 41 to read from the scan instruction DB 32, so it may be determined that it suffices to read only the coordinate onto which the laser light is irradiated. Performing scanning without irradiating the laser may also be called "non-irradiation scanning".

Whether the focal length is adjusted between non-irradiation scanning is according to design of the laser writing device 2.0, so that, even during the non-irradiation scanning, in the laser writing device 20 in which the focal distance adjustment unit 26 adjusts the adjustment focal length even during the non-irradiation scanning, the life estimation apparatus 40 uses the coordinate for the non-irradiation scanning in estimating life.

Determination of Presence/Absence of Consumption Operation

Figure 12:
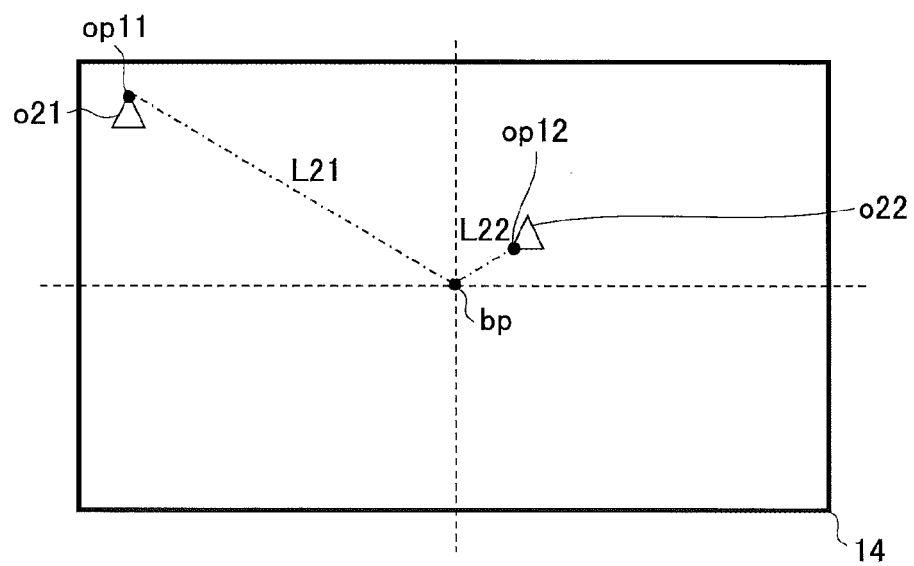
FIG. 12 is one example of a diagram which explains determination on whether the focal distance adjustment unit performed the consumption operation.
Figure 13:
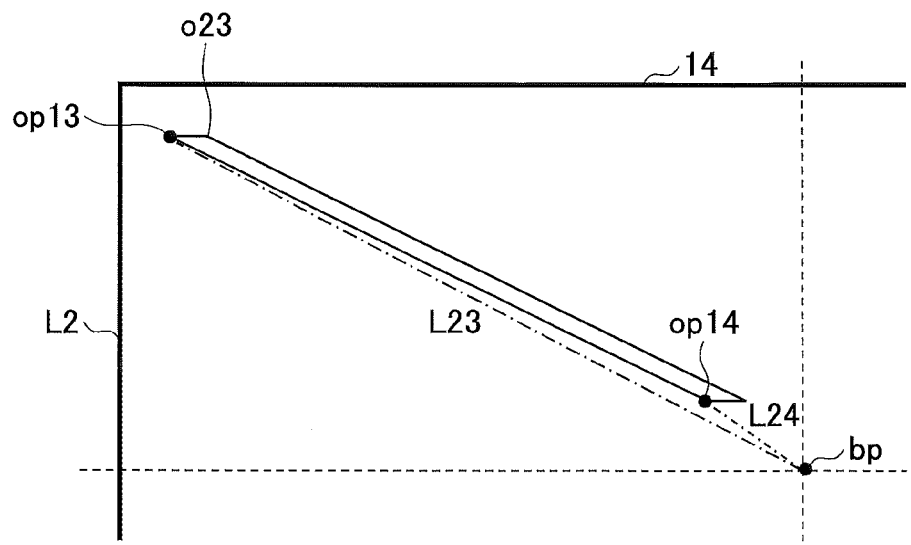
FIG. 13 is one example of a diagram which explains determination on whether the focal distance adjustment unit performed the consumption operation.
Figure 14:
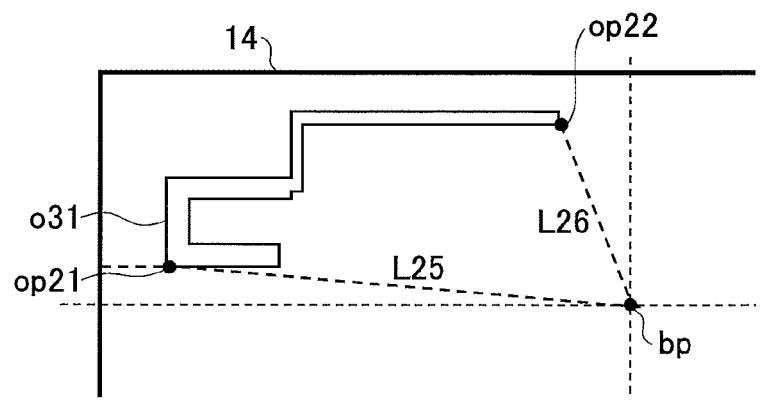
FIG. 14 is one example of a diagram which explains determination on whether the focal distance adjustment unit performed the consumption operation.

FIGS. 12-14 are examples of a diagram which explains determination on whether the focal length adjustment unit 26 performed the consumption operation. The letters in FIG. 12 is described.

bp: reference point
Object o21, object 022: an object drawn with laser light
Point op11: coordinate point which is passed when irradiating laser light onto the object o21
Point op12: coordinate point which is passed when irradiating laser light onto the object o22
Distance L21: distance from reference by to object op11
Distance L22: distance from reference by to object op12

In FIG. 12, on the thermo sensitive recording medium 14 are the objects o21 and o22 onto which the laser light is irradiated. As the sequence of scanning with the laser light, after the laser light is irradiated with the point op11, the scanning is to move over the coordinates without irradiating the laser light to the point op12 of the object o22.

Moreover, in the thermosensitive recording medium 14 of FIG. 13, the object o23 exists as the irradiation position of the laser light. The letters in FIG. 13 are described. The actual line indicates scanning in the state in which the laser light is irradiated.

Object o23: object drawn with laser light
Points op13, op14: coordinate point which is passed when irradiating laser light onto the object o23
Distance L23: distance from reference by to point op13
Distance L24: distance from reference by to point op14

The laser writing device 20 irradiates the object o23 with laser light, so that scanning is performed with laser light from point op13 to op14.

Here, when the non-irradiation scanning is performed from point op11 to point op12 in FIG. 12 and when scanning is performed with laser light from point op 13 to op 14 in FIG. 13, there is a relatively large movement in one time coordinate movement. Here, from the difference of the distance L22 with the reference point by and the point op12 and the distance L21 with the reference point by and the point op11, presence/absence of the consumption operation of the focal point adjustment unit 26 may be determined. Similarly, from the difference of the distance L23 with the reference point by and the point op24 and the distance L24 with the reference point by and the point op14, presence/absence of the consumption operation of the focal point adjustment unit 26 may be determined.

When the reference point by is set such as to make the focal distance to the shortest, the distance L1 and the distance L2 of FIG. 11 being equal means that the distance from the light source to the irradiation position of the laser light is also the same. Moreover, the distance L21 in FIG. 21 being longer than the distance L22, for example, means that the distance between the light source and the object o21 is longer than the distance of the object o22 and the light source. However, rather than calculating the distance from the light source to the irradiation position of laser light based on the coordinates, distance may be calculated from the coordinate point of the scan instruction and the reference point by to reduce the calculation load.

Using FIG. 14, determination of pressence/absence of the consumption operation is described. In the thermosensitive recording medium 14 of FIG. 14, the object o23 exists as the irradiation position of the laser light. The laser writing device 20 draws the object o31 while irradiating the laser light onto multiple points including points op21 and op22.

Here, the shape of the object o31 is a relatively complex shape, drawing is made via multiple points while the scan direction is changed. Thus, the difference in distance from the reference point by and two consecutive coordinates simply does not become larger relative to FIGS. 12 and 13.

However, when looking at the overall coordinates when the object o31 is drawn rather than between the two consecutive coordinates, the difference in distance becomes large. For example, the difference between the distance L26 and the distance L25 from the reference point by of two points of the point op21 and the point op22 becomes large. Thus, based on the coordinates of the point of the overall coordinates of the object, the focal length adjustment unit 26 causes the consumption operation to be performed when drawing the object o31 by the laser writing device 20.

Between two such consecutive points, change in the distance from the reference point by is small and the object is drawn such that the focal length adjustment unit 26 draws, the below-described operation determination target distance Tdst is used for determining the presence/absence of the consumption operation. The operation determination target distance Tdst is a storage area (a variable) for holding the distance from the reference point by and the coordinate point for which the consumption operation was detected last until detecting one time consumption operation.

Figure 15:
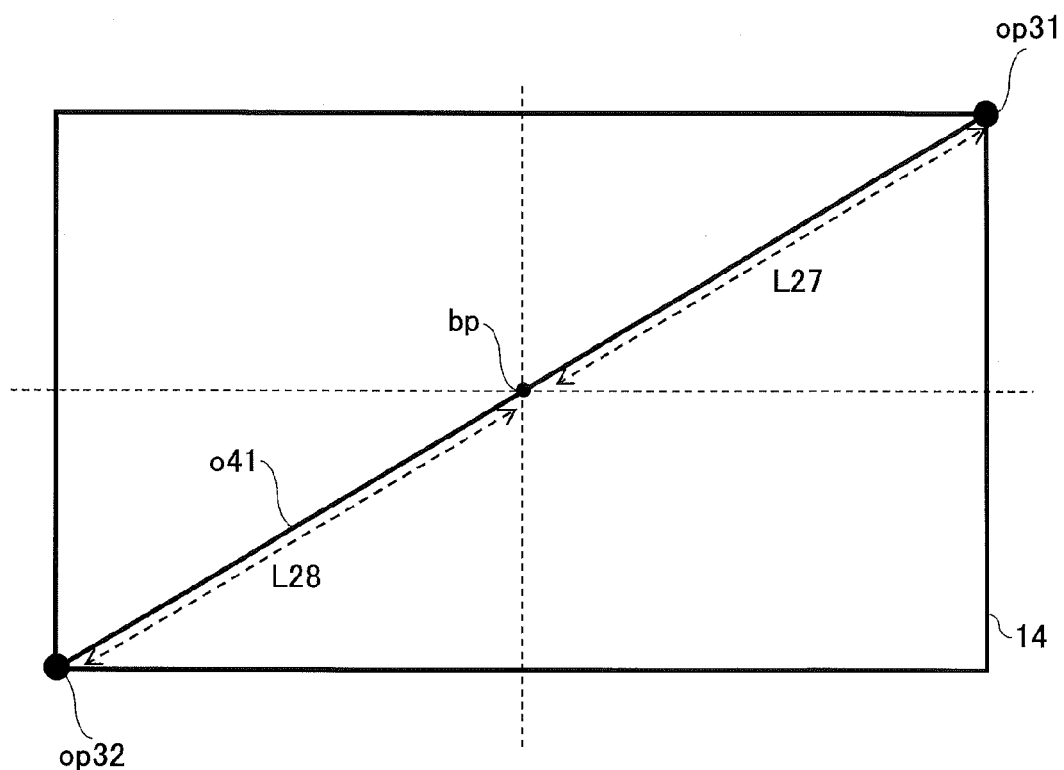
FIG. 15 is one example of a diagram which explains a case in which the comsumption operation may be detected just with the difference of the distance from the reference point bp.

On the other hand, based on FIG. 15, the consumption operation cannot be detected with just the difference in distance from the reference point bp. In the thermosensitive recording medium 14 of FIG. 15, the object o41 exists as the irradiation position by the laser light. The letters in FIG. 15 are described. The actual line indicates scanning in the state in which the laser light is irradiated.

Object o41: object drawn with laser light
Point op31, op32: coordinate point which is passed when irradiating laser light onto the object o41
Distance L27: distance from reference point by to point op31
Distance L28: distance from reference point by to point op32

The laser writing device 20 irradiates the object o41 with laser light, so that scanning is performed with laser light from point op31 to op32. Moreover, it is assumed that the distance L27 from the reference point by to the point op31 and the distance L28 from the reference point by to the point op32 are equal.

Moreover, for drawing the object o41, the laser writing device 20 is to pass the reference point by when performing scanning from point op31 to point op32 for drawing the object o41.

When the laser writing device 20 draws the object o41, it passes from the point op31 (the length of the laser writing device 20 and the thermo sensitive recording medium 14 being maximum) to the reference point by (the length of the laser writing device 20 and the thermo sensitive recording medium 14 being minimum), so it may be said that the focal length has changed significantly and it may be determined that the consumption operation has been performed.

However, with reference to only the difference between the distance L27 and the distance L28 based on the determination criteria described based on FIGS. 12 and 13, the two are equal, so that the difference between the distance L27 and L28 is zero, so it cannot be determined that the consumption operation has been performed.

The life estimation apparatus 40 of the present embodiment appropriately detects the consumption operation even in such conditions, information of the coordinates which are passed when irradiating the laser light is monitored. For this monitoring, the below-described operation determination target coordinate information Tcrd and the current coordinate information Rcrd are used.

Operation Procedure

Figure 16:
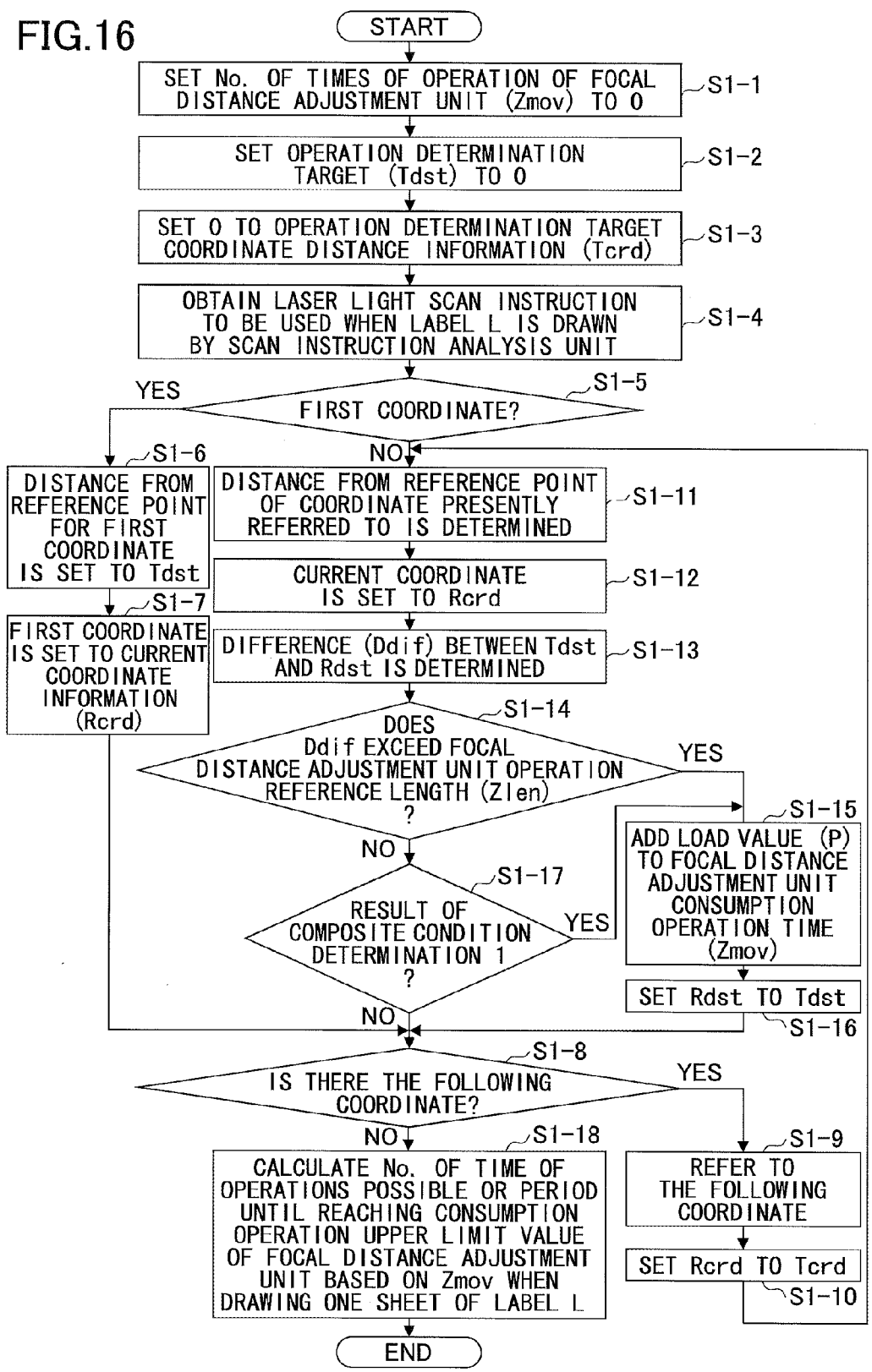
FIG. 16 is one example of a flowchart which explains a procedure for estimating a life of a focal distance adjustment unit by a life estimation apparatus.

FIG. 16 is one example of a flowchart which explains a procedure for estimating a life of the focal length adjustment unit 26 by a life estimation apparatus 40.

S1-1: The life estimation apparatus 40 sets the focal length adjustment unit consumption operation times Zmov to zero. In the focal length adjustment unit consumption operation times Zmov, the number of times it is assumed that the focal length adjustment unit 26 performed is stored. This number of times is handled as a load value.

S1-2: Next, the life estimation apparatus 40 sets the operation determination target distance Zdst to zero. Into the operation determination target distance Tdst is stored a comparison target for determining whether the operation determination target distance Tdst performed the consumption operation.

S1-3: Next, the life estimation apparatus 40 sets zero to the operation determination target distance information Tcrd. The coordinate point on which the laser light was irradiated at an immediate previous time is stored in the operation determination target coordinate information Tcrd.

Figure 3:
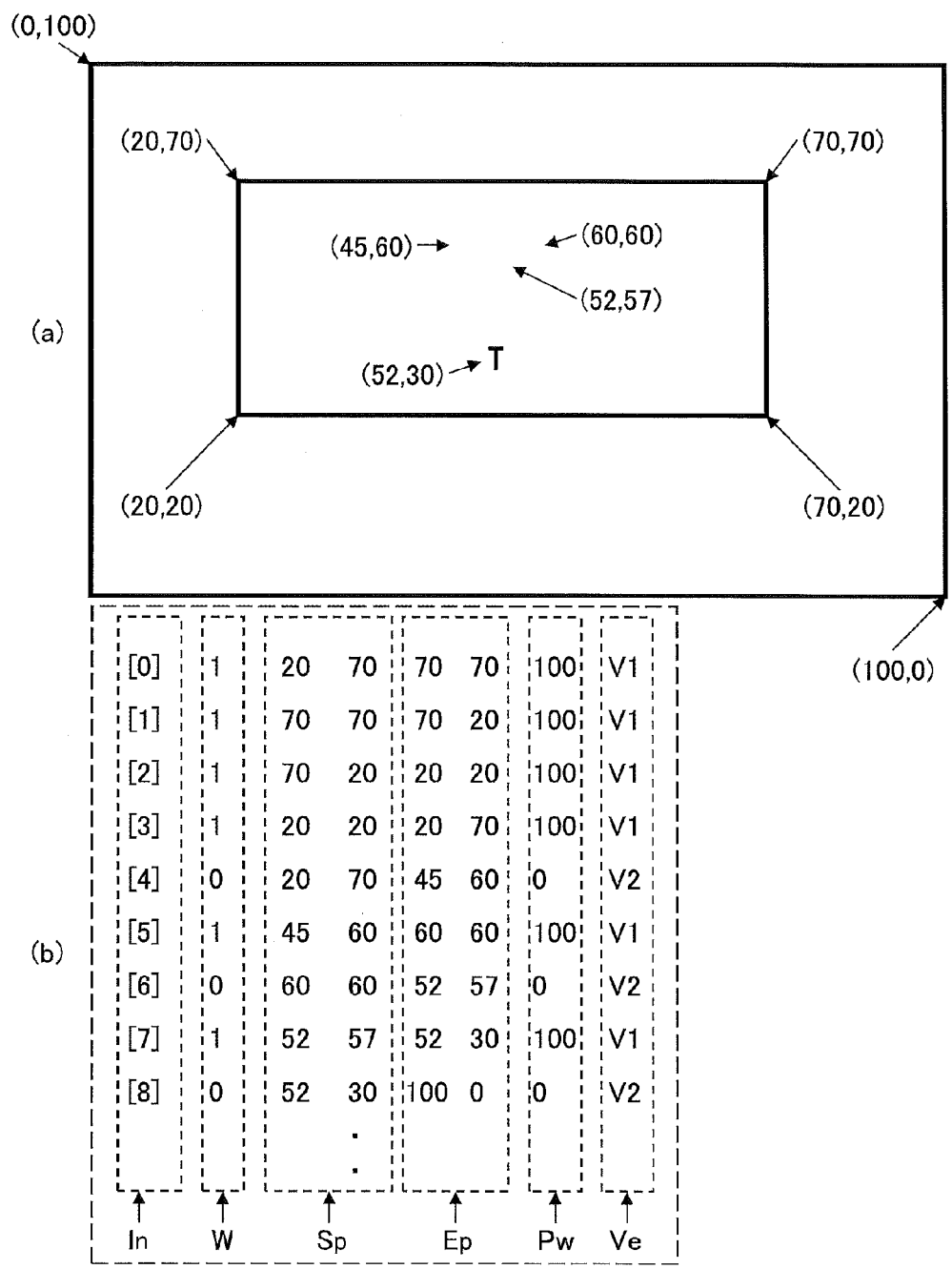
FIG. 3 is a diagram illustrating one example of a letter and a figure to be drawn and one example of a scan instruction used by the laser writing device.
Figure 4:
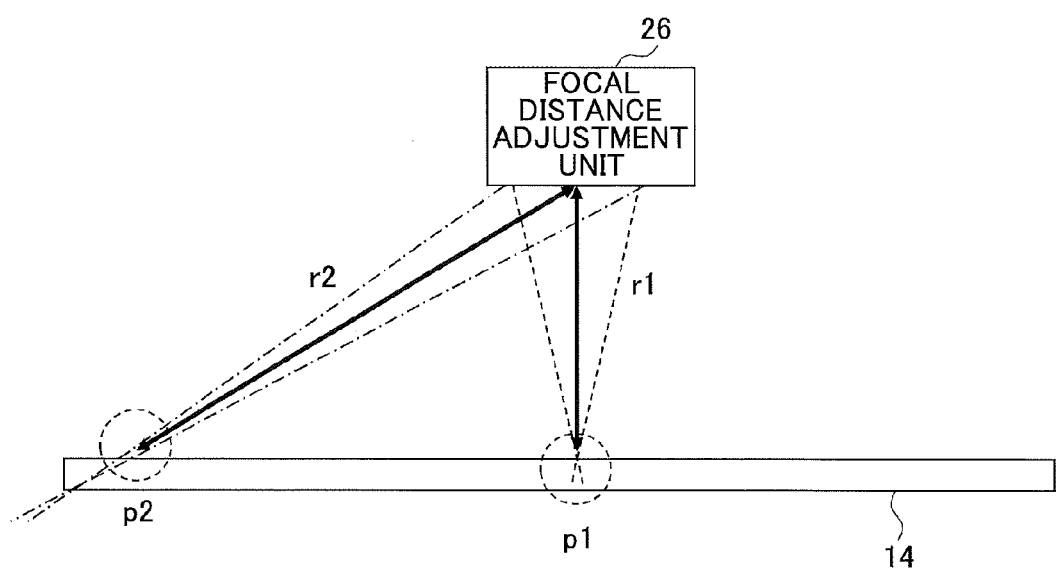
FIG. 4 is one example of a drawing which describes adjustment of a focal length.

S1-4: Next, the scan instruction analysis unit 41 reads and analyzes the scan instruction of the laser light used when a label is drawn. For the laser light scan instruction, the instruction group as shown in FIG. 3 applies, for example.

S1-5: Next, the scan instruction analysis unit 41 determines whether the first coordinate point out of all coordinate points for one label is targeted. In this determination, it is determined, for example, as to whether the scan instruction currently referred to out of the scan instruction groups indicates a head line number (for example, 0). Moreover, for example, when the second coordinate is read, the flag to be ON is referred to, and whether it is the first coordinate may be determined based on the flag being OFF.

S1-6: When determination of step S1-5 is YES, the consumption operation embodiment times calculation unit 42 calculates the distance from the reference point by of the coordinate point Sp of the starting point of the currently referring scan instruction (which is the first scan instruction).

S1-7: Next, the coordinate point Sp of the starting point of the currently referring scan instruction (which is the first scan instruction) is set to the current coordinate information Rcrd.

S1-8: Next, the scan instruction analysis unit 41 determines whether the next coordinate exists.

S1-9: When determined to be YES in step S1-8, the scan instruction analysis unit 41 refers to the following coordinate. This coordinate may be either the coordinate point Ep of the ending point of one scan instruction and the coordinate point Sp of the first point of the next scan instruction. When the next scan instruction indicates laser OFF, the scan instruction analysis unit 41 skips the scan instruction to read the scan instruction of laser ON.

S1-10: Next, the scan instruction analysis unit 41 sets the current coordinate information Rcrd to the operation determination target coordinate information Tcrd. Then, the process proceeds to step S1-11.

S1-11: When determination of step S1-5 is No, or following step S1-10, the process of step S1-11 is executed. The consumption operation performance times calculation unit 42 calculates the distance Rdst from the reference point by of the currently referring coordinate point.

S1-12: Next, the consumption operation performance times calculation unit 42 sets the currently referring coordinate point to the current coordinate information Rcrd.

S1-13: Next, the consumption operation performance times calculation unit 42 calculates the absolute value Ddif of the difference between the distance Rdst and the operation determination target distance Tdst.

S1-14: The consumption operation performance times calculation unit 42 determines whether the absolute value Ddif of the difference exceeds the focal length adjustment unit operation reference length Zlen. Here, the focal length adjustment unit operation reference length Zlen is a distance to be a reference for determining whether the focal length adjustment unit 26 performs the consumption operation. For the distance to be the reference, an arbitrary value is set by the characteristic of the focal length adjustment unit 26 used. For example, in the focal length adjustment unit 26 in which it is determined to be a consumption operation even when the focal length adjustment unit 26 operates just a little, a small value is set to the focal length adjustment unit operation reference length Zlen. Moreover, in the focal length adjustment unit 26 in which the focal length adjustment unit is substantially consumed only when an operation is performed substantially while it is not consumed only when the operation is performed just a little. For example, the distance (or a little smaller value thereof) from the center to the end part of the thermo sensitive recording medium 14 is set.

S1-15: When it is determined to be YES in step S1-14, the focal length adjustment unit consumption calculation unit increases the focal length adjustment unit consumption operation times Zmov by the load value P. The focal length adjustment unit consumption operation times Zmov is one example of the claimed load value. The load value P is as described below.

S1-16: Then, the consumption operation performance times calculation unit 42 sets the distance Rdst to the operation detemination target distance Zmov. In this way, the operation determination target distance Tdst is updated when it is determined to be YES in step S1-14, so that, even when the absolute value Ddif of the difference of the distance of the two consecutive coordinates is small, the absolute value Ddif of the difference may be increased when the difference of the distance in the objects overall is large.

Figures 18A, 18B:
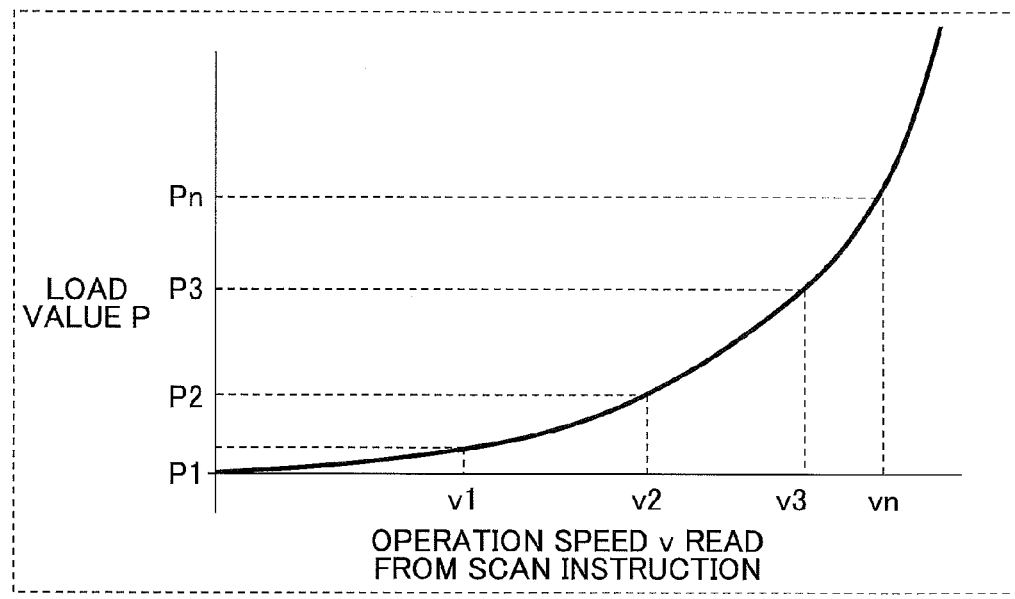
FIGS. 18A and 18B show an examplary drawing which describes aand an operation speed (V) and load value (P)

The load value (P) is explained using FIGS. 18A and 18B. For the precision equipment unit such as a focal length adjustment unit 26, the load to the equipment unit is large and the consumption may be severe for a case of operating at high speed relative to a case of operating slowly. Therefore, as the load value P which is to be added to the focal length adjustment unit consumption operation times Zmov, it is preferable for an arbitrary value to be added taking into account a laser light scanning speed, etc., read from the respective coordinates of the scan instruction.

FIGS. 18A and 18B are one example of a map for determining a load value P from the scan speed of the laser light read from the scan instruction. This example indicates a relationship in which, as the load value P of the scan distance adjustment unit 26 is large, the higher the scan speed of the laser light. Adding, to a focal length adjustment unit consumption operation time Zmov, a load value P determined experimentally using such a map makes it possible to calculate the consumption operation times (in other words, the load value) of the focal length adjustment unit 26 more accurately.

In an embodiment in which a life is calculated from only the times of operation of the focal length adjustment unit 26, a map such as FIG. 18A and 18B is not used without taking into account the load such as the scan speed, etc. In this case, the number of times (in other words, 1) operated is simply added to the focal length adjustment unit consumption operation times Zmov. In this case, the number of consumption operation times itself becomes the load value.

Moreover, without taking into account the load by scan speed, the load may be taken into account by the size of the absolute value Ddif of the difference. For example, when the load value P is determined and added to the focal length adjustment unit consumption operation times Zmov, even in this case, as in FIGS. 18A and 18B, the load value P may be associated with the absolute value Ddif of the difference which exceeds the focal distance adjustment unit operation standard length Zlen.

The load due to the scan speed and the load due to the size of the absolute value Ddif of the difference may be taken into account.

S1-17: When determination of step S1-14 is No, the consumption operation performance times calculation unit 42 performs a further determination "composite 1". When the three determinations (determinations 1-3) below are all Yes, results of determining of S1-S17 are handled as Yes, and when any one is determined to be No, the results of determining S1-17 are handled as No.

Complex Condition Determination 1:

Determination 1: the distance of the current coordinate information Rcrd from the operation determination target coordination information Tcrd exceeds the focal distance adjustment unit operation reference length Zlen.

Determination 2: At least one of the operation determination target distance Tdst or distance Rdst exceeds the focal length adjustment unit operation reference length Zlen.

Determination 3: In between the operation determination target coordinate information Tcrd and the current coordinate information Rcrd is not a non-irradiating scan.

The complex condition determination 1 is determination for detecting a consumption operation which cannot detect the difference Ddif between the distance Rdst and the operation determination target distance Tdst as shown in FIG. 15.

For determinations 1-3, the below is described.

First, the determination 1 determines whether the distance from the operation determination target coordinate information Tcrd to the current coordinate information Rcrd that is the immediately previous coordinate exceeds the focal length adjustment unit operation reference length Zlen. In other words, this is a determination process for determining the distance which exceeds the focal length adjustment unit operation reference length Zlen from the coordinate to the present coordinate, and whether the laser light irradiation position is scanned. Therefore, as shown in FIG. 15, even when the distance L27 and the distance L28 are equal, the consumption operation may be detected.

Moreover, the determination 2 is a process for determining which target does not match the consumption operation out of targets for which the laser light irradiation position was scanned for a distance which exceeds the focal length adjustment unit operation reference length Zlen out of scanning from the previous coordinate to the current coordinate detected in determination 1.

Figure 17:
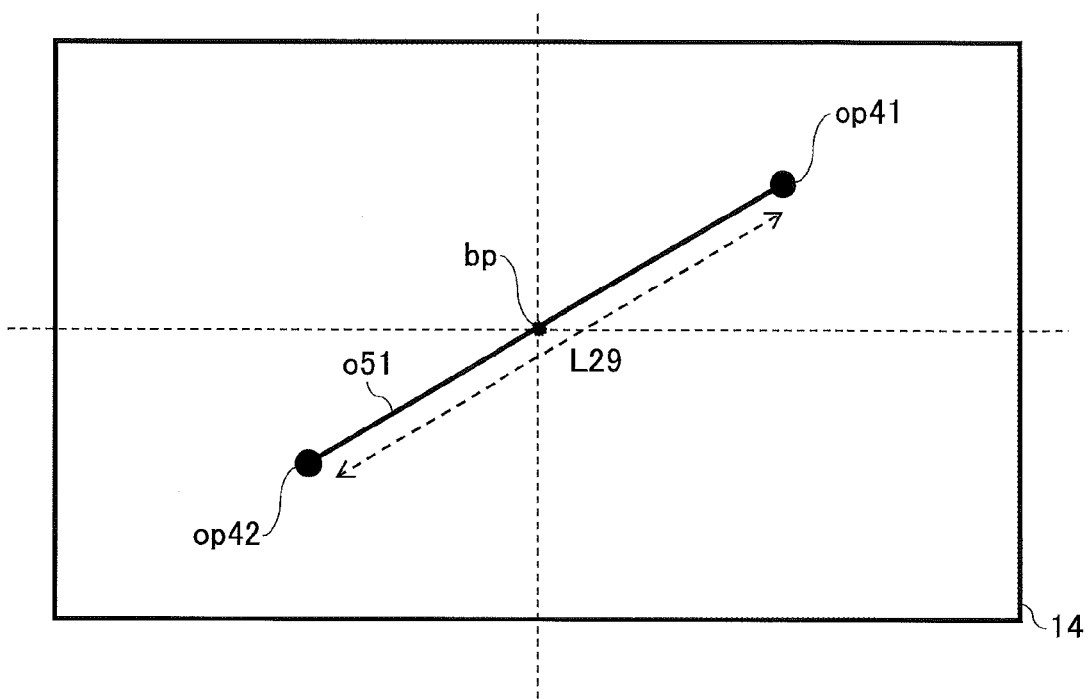
FIG. 17 is one example of a diagram for explaining a determination 2 of step S1-17.

For determination 2, a further explanation is provided using FIG. 17. FIG. 17 is one example of a diagram for explaining a determination 2 in step S1-17. The letters in FIG. 17 are described. The actual line indicates scanning in the state in which the laser light is irradiated.

Object o51: object drawn with laser light

Point op41, op42: coordinate which is passed when drawing laser light onto the object o51

Distance L29: distance from point op41 to point op42

The laser writing device 20 irradiates the object o51 with laser light, so that scanning is performed with laser light from point op41 to op42. In an example in FIG. 17, in order to draw the object o51, the distance L29 between the point op41 and the point op42 passed is to be somewhat longer than the focal length adjustment unit operation reference length Zlen for the purpose of explanations.

Here, while the distance L29, which is the length of the object o51, exceeds the focal length adjustment unit operation reference length Zlen, it is arranged that the object o51 straddles the reference point bp. Moreover, the distance from the reference point by to the point op41 and the distance from the reference point by to the point op42 is shorter than the focal length adjustment unit operation reference length Zlen. Therefore, a distance by which the focal distance is adjusted is shorter than the focal length adjustment unit operation reference length Zlen, so that the consumption operation should not be determined. Therefore, with the determination 2, it is determined that the consumption operation is not to be performed between the point op41 and the point op42 when drawing the object o51.

In other words, the drawing target to be Yes in determination 1 and determination 2 of the complex condition determination 1 is a position at which at least one coordinate exceeds the focal length adjustment unit operation reference length Zlen and is a target which is scanned by a distance exceeding the focal length adjustment unit operation reference length Zlen.

In this way, the determination 2 of the complex condition determination 1 of step S1-17 in FIG. 16 is a condition for shaking off drawing of the object o51 in FIG. 17 from the targets for which it is determined that drawing of the object o51 is an operation operation in FIG. 17.

In other words, the drawing target to be Yes in both determination 1 and determination 2 in complex condition determination 1 may be determined to be a target for which at least one coordinate is located at a position which is past the reference point bp by the focal length adjustment unit operation standard length Zlen and which is scanned by a distance exceeding the focal distance adjustment unit operation standard length Zlen therefrom.

The above makes it possible to shake off the drawing target such that it straddles the reference point by as shown in FIG. 17.

The determination 3 of the complex condition determination 1 is a determination process for shaking off the drawing target which is non-irradiation scanned, by a non-irradiation scan as shown in FIG. 11, from a position which exceeds the focal position adjustment unit operation reference length Zlen to a position which, in the same manner, exceeds a different focal distance adjustment unit operation reference length Zlen.

S1-8: Returning to FIG. 16, when determination of step S1-17 is No, or after the process of step S1-16 is completed, the scan instruction analysis unit 41 determines whether the following coordinate exists.

S1-18: As a result of step S1-8, when the following coordinate does not exist, the focal length adjustment unit 43 determines that the value of the current focal length adjustment unit consumption operation times Zmov is determined as the times (the load value) of performing the consumption operation for drawing one label in the thermosensitive recording medium 14. Based on the adjustment distance adjustment unit consumption operation times Zmov, the life calculation unit 44 calculates the operable times or the period up to reaching the operational upper limit of the focal length adjustment unit 26.

Details of the Life Calculation

The estimation of life of the focal distance adjustment unit 26 by the life calculation unit 44 is described. The focal length adjustment unit 26 sets the upper limit value for which the consumption operation can be performed to the consumption operation performance times upper limit ZMmax (as one example of the claimed upper limit load value). The life calculation unit 44 calculates the value up to reaching a life such as how many sheets of labels may be drawn up to when the focal length adjustment unit 26 reaches the consumption operation performance times upper limit value Zmax, or how many days drawing may be made up to when the focal length adjustment unit 26 reaches the consumption operation performance times upper limit value Zmax.

When the laser writing device is not operational (when the laser writing device 20 is new), the consumption operation performance times upper limit value ZMmax of the focal length adjustment unit 26 may be divided by the focal length adjustment unit consumption unit consumption operation times Zmov for drawing one label sheet to calculate how many sheets of labels before the focal length adjustment unit 26 reaches life.

Here, in the factory or distribution center, for example, the drawing sheet number and the operation time of the laser writing device 20 may be determined. In such an environment, the number of sheets in one day may be specified. When the laser writing device 20 is an non-operational state in which it has not operated in the past, the life may be estimated as follows. When the laser writing device 20 assumes that M sheets in one day is drawn, the consumption operation performance times upper limit ZMmax may be divided by "Zmov×M (sheet)" to determine how many days up to life the focal length adjustment unit 26 may be determined.

With a method of this life estimation, the number of sheets of drawing the label is used to calculate the period or the number of times of printing until reaching the life of the focal distance adjustment unit 26 using the number of sheets of drawing the label. However, in lieu of the number of sheets of drawing, the number of times of drawing from the laser irradiation time of the laser writing device 20 may be estimated to estimate life. For example, it is possible to determine the rough value of the number of sheets drawn in one day by dividing, by the laser irradiation time when drawing one sheet of label, the laser irradiation time of one day of the laser writing device 20.

Moreover, while the above-described method assumes that the laser writing device 20 is non-operational, life may be estimated after operating the laser writing device 20 for a certain period. For example, the label drawn by the laser writing device 20 during the period is analyzed and the load ZMnow which is currently applied to the focal length adjustment unit 26 may be calculated and the load ZMnow may be subtracted from the consumption operation performance times upper limit value ZMmax to calculate how much amount remaining may be used. In other words, (ZMmax−ZMnow)÷(Zmov×M) may be used.

Moreover, the final load coefficient may be applied to the load ZMnow and the focal length adjustment unit performance operation times Zmov. For example, under the operation environment of the laser writing device 20, the number of days the temperature has reached beyond the operation guarantee of the focal distance adjustment unit 26 may be used. When operating under the low temperature and under the high temperature outside the operation guarantee, the precision equipment unit such as a focal distance adjustment unit 26 may be consumed earlier than when operating under the temperature environment under the operation guarantee. In other words, the environment factor of temperature effects the life of the focal length adjustment unit 26.

Now the estimation of life in the environment outside the operation guarantee is described. In the example below, when operating at the temperature outside the operation guarantee, it is assumed that the focal length adjustment unit is consumed at twice the speed when operated at the temperature within the operation guarantee when operating at the temperature outside the operation guarantee. Moreover, under the operation environment of the laser writing device 20, the day to day temperature is measured.

Here, when the life of the focal length adjustment unit 26 is estimated, the number of days that the temperature of the laser writing device reached the temperature outside the operation guarantee may be calculated, so that the load coefficient which takes into account the number of days is to be multiplied with the focal length adjustment unit consumption operation times Zmov. For example, the scan instruction analysis unit 41 of the life estimation apparatus 40 obtains the temperature detected at the time of operation and scan instructions at the time of operating the laser writing device.

As one specific example, assume that the number of days the laser writing device 20 is 100 days, out of 3 days, assume that the environment temperature of the laser writing device is outside the operation guarantee (for example, it is outside the temperature range when the operation guarantee temperature is between T1 and T2.) In this determination, it may be determined that it is outside the operation guarantee when the temperature outside the operation guarantee is detected even once within one day. This "one day" is the exemplary claimed specified period.

The calculation method of the focal length adjustment unit consumption operation times ZMnow when taking into account the load coefficient here is as in equation (1).

$$ZMnow = Zmov \times (100-3) + Zmov \times 3 \times 2 \quad (1)$$

It is assumed that Equation (1) is calculated with the focal length adjustment unit consumption operation times Zmov as the double load that corresponds to 3 days in which the environment temperature of the laser writing device 20 reaches outside the operation guarantee. The remaining life may be estimated by decreasing the focal distance adjustment unit consumption operation times Zmnow from the consumption operation performance times upper limit value ZMmax.

When the numerical value "2" which is larger than 1 is multiplied in equation (1), the value smaller than 1 may be multiplied. For example, in a certain temperature range, a load may decrease compared to when the temperature is within the operation guarantee in a certain temperature range. In this case, a value smaller than 1 may be multiplied to the number of days operated in a temperature range in which the load decreases to calculate a more accurate focal length adjustment unit consumption operation times ZMnow.

While the load is taken into account based on the environmental temperature, the environmental factor which takes into account dust, vibration, and humidity other than the temperature may be taken into account.

As described above, the life estimation apparatus 40 of the present embodiment may compare the difference of the distance between the reference point by and the scan instruction may be estimated. Moreover, the life may be estimated based on the scan instruction to estimate life without operating the laser writing device 20, so that the life of the focal life adjustment unit 26 can be projected at the time of implementing the apparatus or therebefore.

Moreover, the weighting may be performed in accordance with the scan speed of the laser light to calculate the load on the focal distance adjustment unit 26 to estimate life accurately from when the consumption operation times of the focal distance adjustment unit 26 makes a simple computation.

EXAMPLE 2

In example 1, the life of the focal distance adjustment unit 26 could be calculated based on the scan instruction without operating the laser writing device 20. Therefore, for example, a few years before the actual life of the laser writing device 20, the life of the apparatus and the focal distance adjustment unit 26 may be projected.

However, in embodiment 1, the operation of the focal length adjustment unit 26 is analyzed to calculate the life, assuming that the laser writing device 20 draws one type of label. When the laser writing device 20 draws multiple different labels, with the method in embodiment 1, the accuracy of estimation of life could decrease.

Thus, in the present embodiment, the life estimation apparatus 40 which estimates the life is described when the laser writing device 20 draws multiple different types of labels. The life estimation apparatus 40 according to the present embodiment includes the standard operation load analysis unit to analyze the reference operation load value of the focal length adjustment unit 26 from multiple different types of labels.

In the present embodiment, for the element to which the same letter is affixed, the same function is served, so that explanations of the constituting element once explained is omitted or only the difference is explained.

Figure 19:
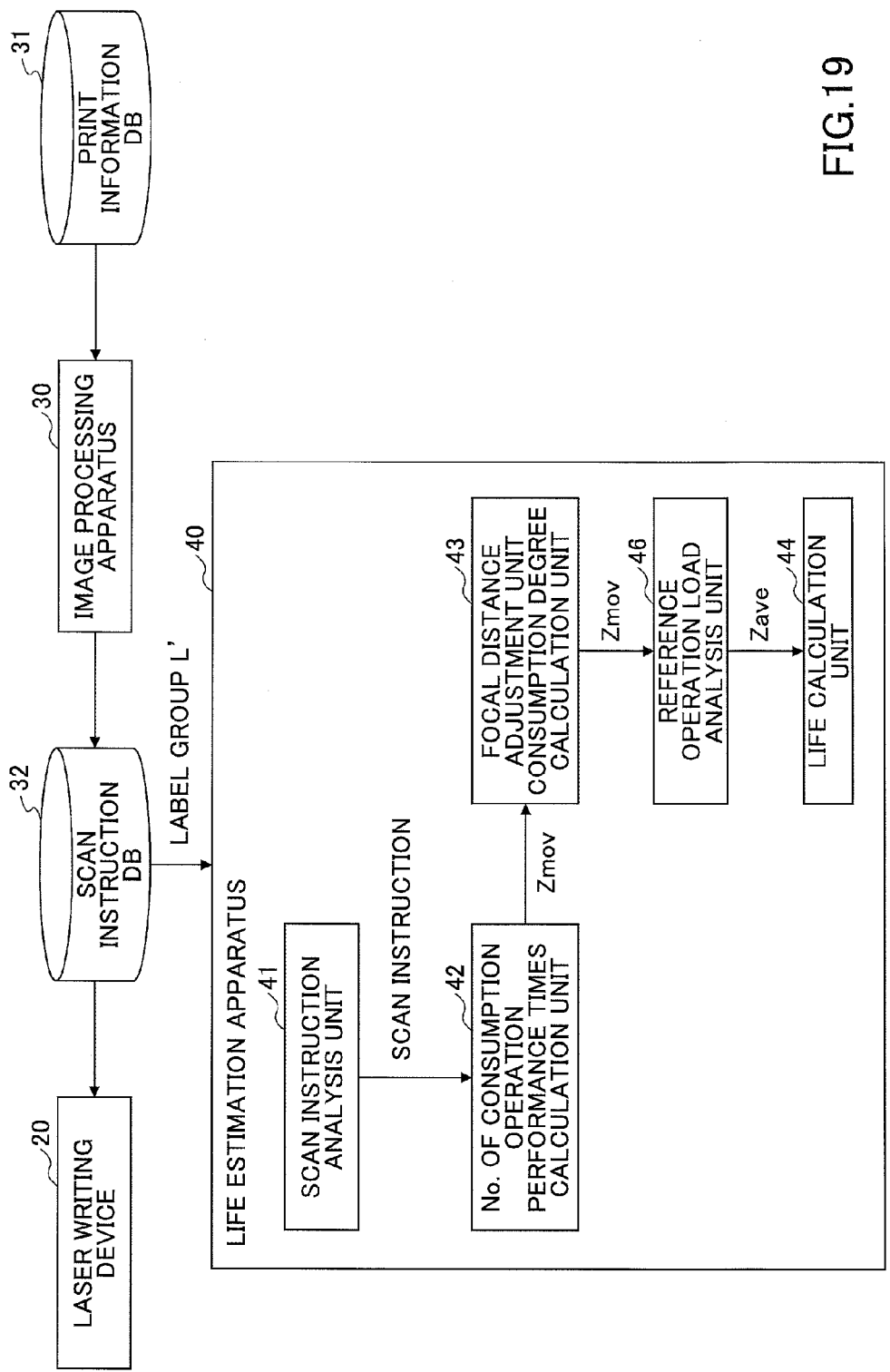
FIG. 19 is an exemplary functional block diagram of a life estimation apparatus (embodiment 2)

FIG. 19 is an exemplary functional block diagram of a life estimation apparatus 40 of the present embodiment. The life estimation apparatus 40 of the present embodiment includes a reference operation load analysis unit 46. The reference operation load analysis unit 46 weights the focal length adjustment unit consumption operation times Zmov of multiple different labels with the number of sheets drawn in a certain period (for example, one day) to calculate the reference operation load value to be the reference for a certain period.

Moreover, as indicated in FIG. 20, in the present embodiment, the laser writing device 20 draws the label group L' which includes multiple different types of labels. The label group L' includes N types (N>1) of labels (L'-1, L'-2, . . . , L'-N).

Figure 20A:
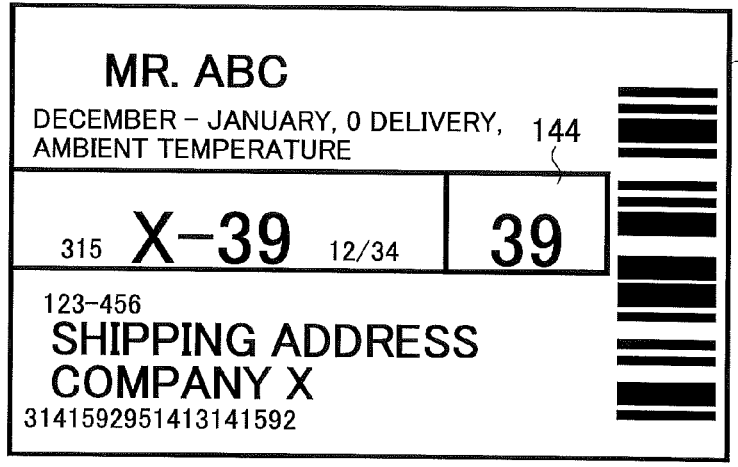
FIGS. 20A to 20C are diagrams illustrating an exemplary label of a label group L'.
Figure 20B:
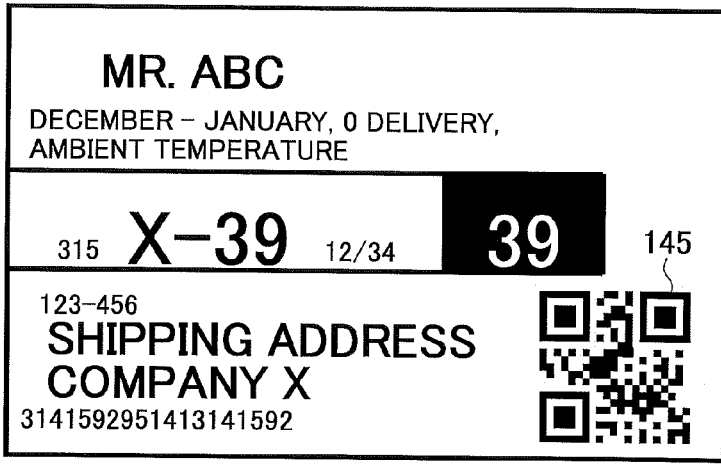

FIGS. 20A and 20B are diagrams illustrating an exemplary label of the label group L'. In a label L'-1 in FIG. 20A, for the shaded portion 144 in FIG. 1, white and black are reversed. When there is a shaded portion in FIG. 1, for the letter "39", scanning is performed for the other range while retaining 39. As shown in FIG. 20A, when the letter "39" is shown with a stroke, the curve is replaced with a line segment, so that the line segment is colorized. Therefore, even when the label for which the black and white are reversed displays the same information, the load which is applied to the focal distance adjustment unit 26 differs.

Figure 1:
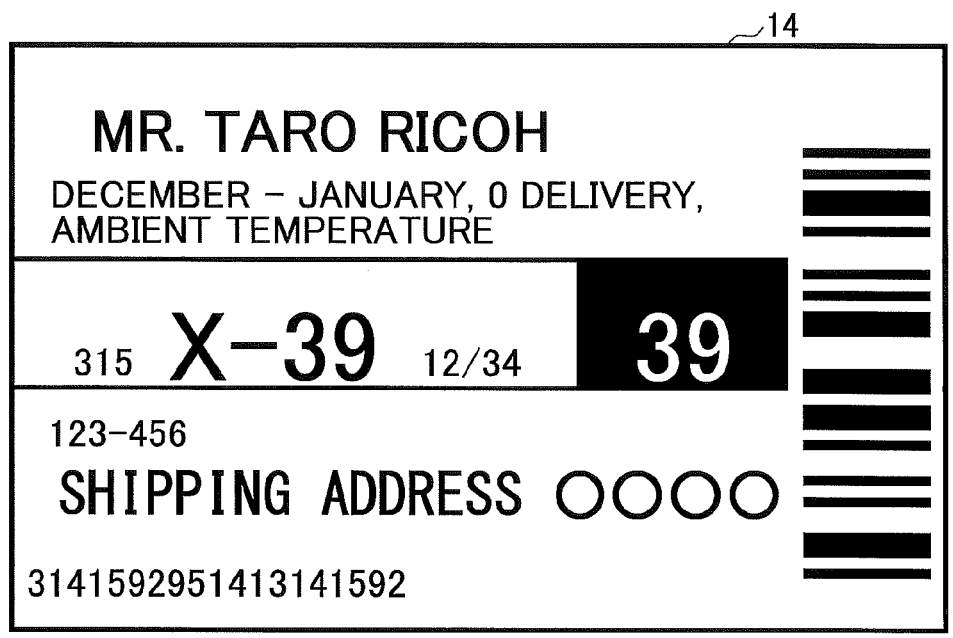
FIG. 1 is an exemplary drawing illustrating an exemplary drawing onto a thermo sensitive recording medium used as a label.
Figure 2A:
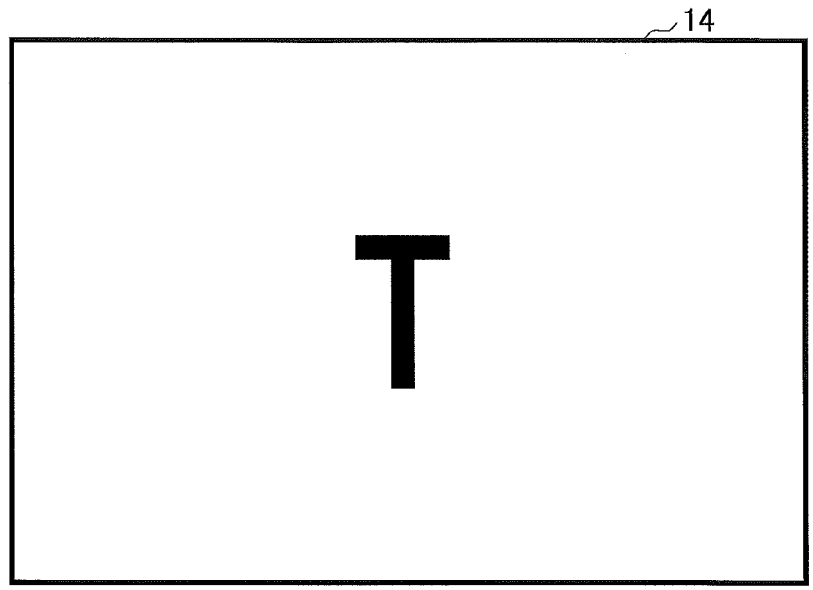
FIGS. 2A and 2B are examples of a drawing which explains an exemplary drawing of a letter of "T", which is drawn onto the thermo sensitive recording medium.
Figure 2B:
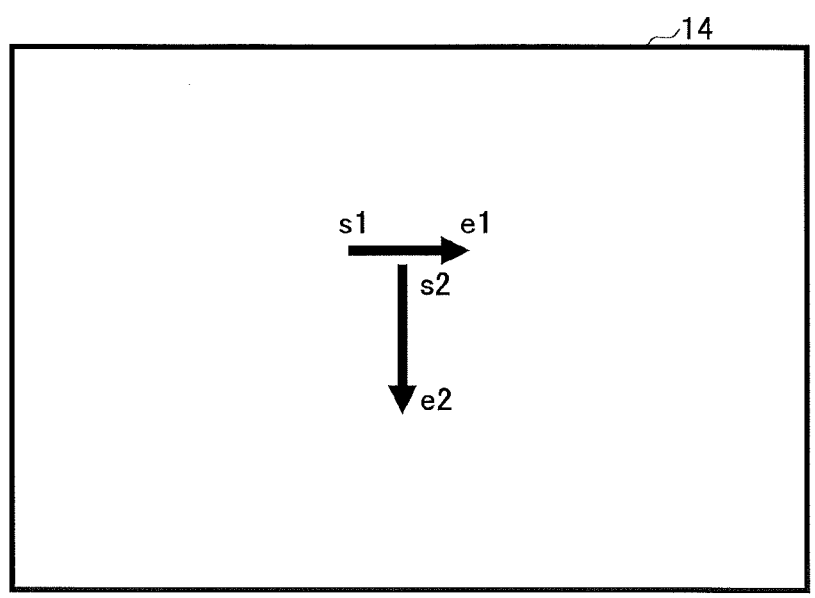

In black L'-2 in FIG. 20B, the bar code in FIG. 1 is replaced by the two-dimensional bar code 145. For the bar code, relatively long straight line is repeatedly drawn, but when it is the two-dimensional bar code 145, the short straight line is repeatedly drawn. Therefore, when the type of barcode changes, the load applied to the focal distance adjustment unit 26 differs.

Figure 20C:
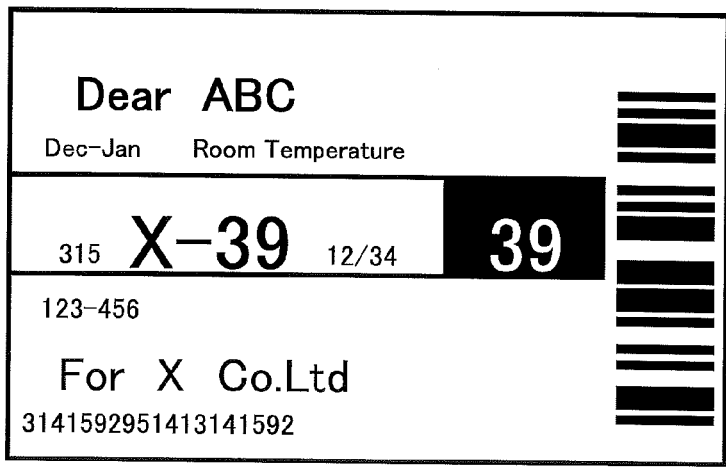

In the label L'-3 in FIG. 20C, the letters which configure the label in FIG. 1 is described in characters. If the number of line segments of the scan instruction differ, in the Japanese and the characters, the load which is applied to the focal distance adjustment unit 26 differs.

In this way, when the type of labels differ, the load applied to the focal distance adjustment unit 26 differs, so it is preferable that the life estimation apparatus 40 calculates a load value for each label.

Figure 21:
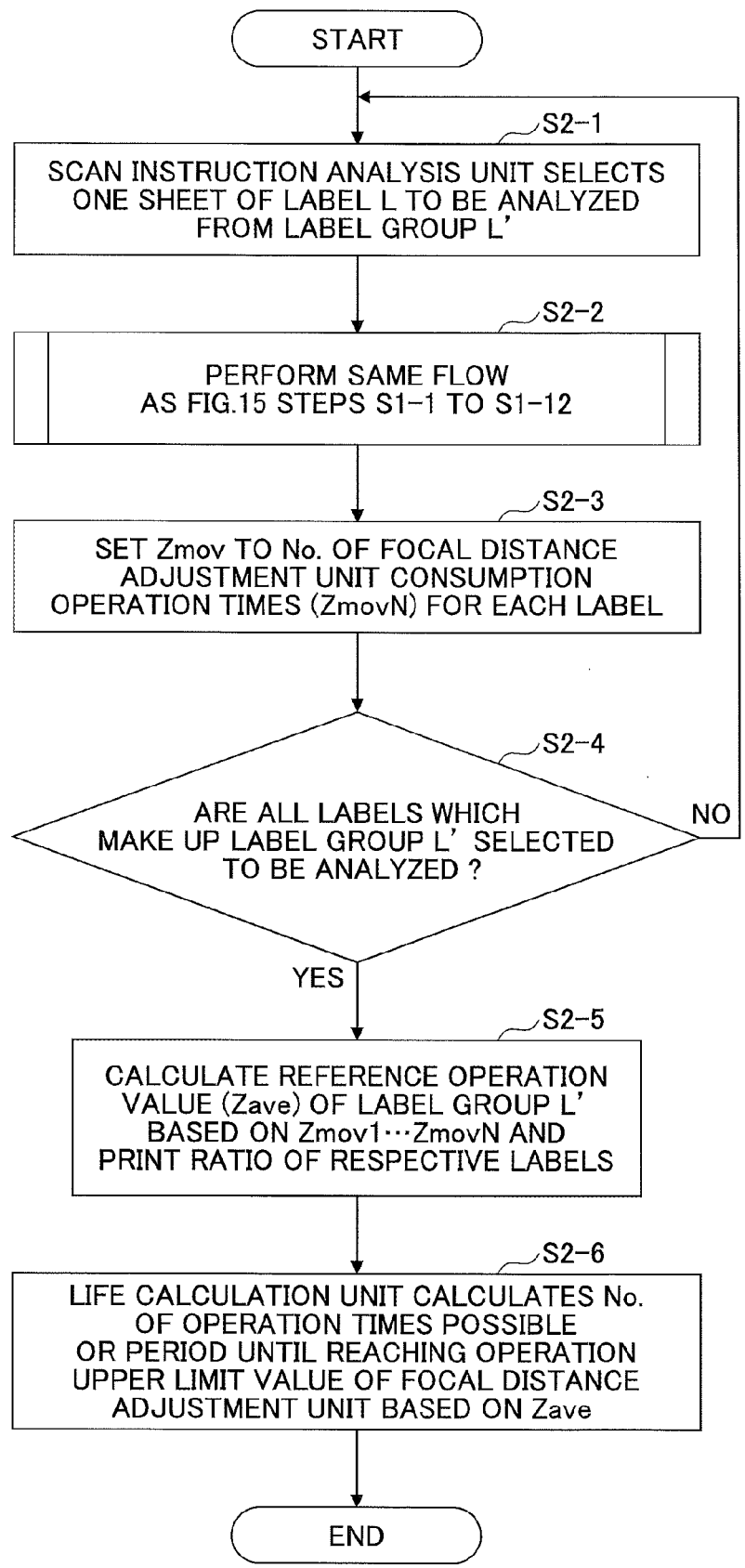
FIG. 21 is one example of a flowchart which explains a procedure for estimating a life of a focal distance adjustment unit by a life estimation apparatus.

FIG. 21 is one example of a flowchart which explains a procedure for estimating a life of a focal distance adjustment unit 26 by a life estimation apparatus 40 of the present embodiment. Below, a life estimation method of a focal length adjustment unit 26 of a laser writing device 20 which draws the label group L' including multiple types of labels is explained using a flowchart of FIG. 21.

S2-1: The scan instruction analysis unit 41 selects one sheet of a label to be analyzed from the label group L'.

S2-2: The life estimation apparatus 40 to the label selected to be analyzed performs a process from step S1-1 to S1-17 of FIG. 16 in embodiment 1 and calculates the focal distance adjustment unit consumption operation times Zmov of the focal distance adjustment unit 26 when the label selected to be analyzed is drawn.

S2-3: Next, the focal distance adjustment unit consumption operation times Zmov calculated in the above-described step is set to the consumption operation times Zmove per label. This consumption operation time ZmovN for each label is a region for storing the focal distance adjustment unit consumption operation times Zmov for each label selected in S2-1. For example, when the label group L' includes three labels, three (Zmov1, Zmov2, Zmov3), being the same number as the label group L' also exist. Moreover, for the consumption operation times ZmovN for each label set in S2-3, a different ZmovN is specified from Zmov specified in the past. For example, considering a situation in which the label group L' has three (label L'-1, label L'-2, label L'-3), the following statement is envisaged.

Set Zmov1 of label L'-1 Zmov to Zmov1;
Set Zmov2 of label L'-2 Zmov to Zmov2;
Set Zmov3 of label L'-3 Zmov to Zmov3;

S2-4: Next, the scan instruction analysis unit 41 determines whether all labels which configure the label group L' are determined. When there is a label which is not selected to be analyzed, the process returns to S2-1 in FIG. 21, and, out of labels which configure the label group L', the scan instruction analysis unit 41 specifies the label not calculated by the focal length adjustment unit consumption operation times Zmov. Calculation of the focal length adjustment unit consumption operation times Zmov is performed until all of labels which make up the label group L' are selected as the analysis subject by the scan instruction analysis unit 41.

S2-5: In step S2-4, when all labels which make up the label group L' are selected to be analyzed, the reference operation load analysis unit 46 calculates the reference operation load value Zave of the label group L' when all labels which make up the label group L' are selected. Until all labels which include the label set L' are selected to be analyzed by the scan instruction analysis unit 41, calculation of the focal length adjustment unit consumption operation times Zmov is performed.

S2-5: In step S2-4, when all labels which make up the label group L' are selected to be analyzed, the reference operation load analysis unit 46 calculates the reference operation load value Zave based on the ratio that the label L'-1, L'-N which make up the label group L' are drawn within a certain period.

The reference operation load value Zave is described. For example, there are 3 types of the label which makes up the label group L' of the label L'-1, the label L'-2, and the label L'-3. Under these conditions, the laser writing device 20 draws the respective ratios of 2:3:5 of the labels L'-1, the labels L'-2, and the labels L'-3 to the total number of sheets drawn in one day.

When the focal distance adjustment unit consumption operation times ZmovN for each label when these labels are drawn once is to be Zmovl for drawing a label L'-1, Zmov2 for drawing a label L'-2, and Zmov3 for drawing a label L'-3. In an example as described above, the reference operation load analysis unit 46 may be calculated as follows to define the reference operation load value Zave of the label group L'.

The reference operation load value Zave is one example of the claimed "multiple label writing load value".

$$Zave=(Zmov1\times2/10)+(Zmov2\times3/10)+(Zmov3\times5/10)$$

In the present embodiment, the number of sheets drawn for a predetermined period of multiple types of labels are used to calculate the standard operation load value Zave. For example, for the laser irradiation time in a certain period (for example, one day), the ratio of a laser irradiation time for each label may be determined to calculate the reference operation load value. Other parameters may be used.

S2-6: Next, with the reference operation load value Zave calculated by the reference operation load analysis unit 46 as corresponding to one time of drawing, or the focal length adjustment unit consumption times for each sheet of label, the times which can be printed, or a period until the life calculation unit 44 reaches the life of the focal length adjustment unit 26. The printable times or the period up to reaching the life of the focal length adjustment unit 26 may be calculated in the same manner as what is described in the embodiment 1.

For example, when the number of sheets for each day is 20 for label L'-1, 30 for label L'-2, and 50 for label L'-3, the life (the number of usable days) may be calculated as follows:

$$\text{The number of usable days}=Zmax/(Zave\times100)$$

In other words, the reference operation load value Zave may be calculated to estimate the life in the same manner as the embodiment 1, even in a factory in which there are multiple types of labels.

While the operational analysis of the focal distance adjustment unit 26 of all N types of labels when the label group L' is configured with N types of labels in the present embodiment, not all N types are analyzed, so that the operational analysis of only the specific multiple types may be performed in alignment with the operation format of the laser writing device 20.

Moreover, the life of the focal length adjustment unit operation times 26 may be calculated by adding, for the number of times of drawing of the respective labels, the focal length adjustment unit composition operation times Zmov when the respective labels L'-1, L'-2, . . . , L'-N make up the label group L' without determining the reference operation load value Zave. Assume that the focal distance adjustment unit consumption operation times Zmov of the respective labels L-1 to L-N for one day are assumed to be the number of sheets of the respective labels L-1 to L-N of k1, k2, . . . kn for Zmov1, Zmov2, . . . ZmovN. Therefore, the total Ps of the focal distance adjustment unit consumption operation times Zmov for one day is as follows.

The total number Ps of the focal length adjustment unit consumption operation times Zmov in one day $$=k1\cdot Zmov1+k2\cdot Zmov2+\ldots+kn\cdot ZmovN$$

The value in which the consumption operation performance times upper limit value ZMmax is divided by the total Ps of the focal length adjustment unit consumption operation times Zmov of one day is a life of the focal length adjustment unit 26 as the number of days.

Moreover, even in the present embodiment, when the life is estimated from the reference operation load value Zave, the calculation which takes into account the load value by the environment may be performed in the same as the embodiment 1.

As described above, according to the life estimation apparatus 40 of the present embodiment, even when the laser writing device 20 draws the multiple types of labels, the reference operation load value Zave to be the reference of the focal length adjustment unit 26 from these labels is defined to calculate the life of the focal length adjustment unit 26.

The present application is based on and claims the benefit of priority of Japanese Priority Application No. 2014-053943 filed on Mar. 17, 2014, the entire contents of which is hereby incorporated by reference.

The invention claimed is:

1. A load estimation apparatus which estimates a load added to a laser light irradiation apparatus, wherein a focal length adjustment unit adjusts a focal length in accordance with a distance from a light source to a light irradiation position in a recording medium, the load estimation apparatus comprising:
a memory storing computer-readable instructions; and
one or more processors that execute the computer-readable instructions such that the one or more processors are configured to
obtain control data in which the light irradiation position is instructed with a coordinate;
analyze the coordinate of the control data to detect an operation amount and recording a number of times a focal length of the focal length adjustment unit is to be adjusted;
accumulate load value information of the focal length adjustment unit in response to results of comparing a threshold number of times the focal length can be adjusted and the recorded number of times the focal length of the focal length adjustment unit is to be adjusted; and
estimate the life span of the focal length adjustment unit based on the accumulated load value information and the recorded number of times the focal length of the focal length adjustment unit is to be adjusted.

2. The load estimation apparatus as claimed in claim 1, wherein the one or more processors are configured to cause the load value information to be increased when the operation amount is larger than the threshold.

3. The load estimation apparatus as claimed in claim 2, wherein the one or more processors are configured to obtain, from the control data, scan speed when the light irradiation position changes the optical scan position from a first coordinate to a following second coordinate of the first coordinate, and wherein
the one or more processors are further configured to cause the load value information to be increased further the higher the scan speed when the operation amount is larger than the threshold.

4. The load estimation apparatus as claimed in claim 2, wherein, when the operation amount is larger than the threshold, the one or more processors are configured to cause the load value information to be increased further the larger the operation amount when the operation amount is larger than the threshold.

5. The load estimation apparatus as claimed in claim 1, wherein the one or more processors are further configured to calculate a difference between a first distance from the laser light irradiation apparatus to the recording medium when a direction of the light irradiation position is controlled by a first coordinate and a second distance from the laser light irradiation apparatus to the recording medium when the direction is controlled by a following second coordinate of the first coordinate, wherein
the one or more processors are further configured to accumulate the load value information in response to results of comparing the threshold and the operation value with the difference as the operation amount.

6. The load estimation apparatus as claimed in claim 5, wherein
the one or more processors are further configured to calculate a difference between a fourth distance from the reference point to the second coordinate and a third distance from a predetermined reference point to the first coordinate in the recording medium, and wherein
the one or more processors are further configured to acumulate the load value information in accordance with results of comparing the threshold and the operation amount with the difference as the operation amount.

7. The load estimation apparatus as claimed in claim 6, wherein the one or more processors are further configured to increase the load value information when the difference is larger than the threshold, wherein, even when the difference is smaller than the threshold,
a distance between the first coordinate and the second coordinate is larger than the threshold, and
wherein the load value is increased when at least one of the third distance and the fourth distance is larger than the threshold.

8. The load estimation apparatus as claimed in claim 5, further including:
a first storage region in which the first distance is stored; and
a second storage region in which the second distance is stored,
wherein, the one or more processors are further configured to update the first storage region with the second distance stored in the second storage region when the difference is larger than the threshold, and does not to update the first storage region when the difference is no larger than the threshold,
wherein each time a coordinate following the second coordinate is obtained, a distance from the laser light irradiation apparatus to the recording medium is stored in the second storage region as the second distance, and
wherein the one or more processors are further configured to compare the difference between a value of the second storage region and a value of the first storage region with the threshold.

9. The load estimation apparatus as claimed in claim 1, wherein the one or more processors are further configured to:
estimate a life of the focal length adjustment unit from an upper limit load value of the focal length adjustment unit and the load value information.

10. The load estimation apparatus as claimed in claim 9, wherein the one or more processors are further configured to calculate the load value information based on the control data which the laser light irradiation apparatus refers to for each predetermined period;
the one or more processors obtain environmental factor information which affects the life of the focal length adjustment unit, wherein
when information on the environmental factor of the predetermined period does not fall into a predetermined range, the one or more processors multiply a predetermined coefficient by the load value information determined from the control data of the predetermined period, wherein
the one or more processors are further configured to estimate the life of the focal length adjustment unit from the upper limit load value and the load value information of a predetermined period, in which is totaled the load value information on the predetermined period in which the information on the environmental factor falls into the range and the load value information on the predetermined period in which the information on the environmental factor does not fall into.

11. The load estimation apparatus as claimed in claim 9, wherein the control data creates for each label in which the visual information is drawn with the laser light,
wherein the one or more processors are further configured to calculate the load value information of one label, and calculate a number of days usable by dividing the upper limit load value by a product of the number of sheets of drawing the label for each perdetermined period and the load value information on the label.

12. The load estimation apparatus as claimed in claim 9, wherein the control data creates each label in which the visual information is drawn with the laser light, wherein the obtaining unit obtains the control data for each label of different types, wherein one or more processors are further configured to calculate the load value information for each label, and calculate multiple label weighting values by weighting the load value information of the respective labels by a ratio of the number of sheets drawn of the respective labels to the total number of sheets drawn of the label for each predetermined period.

13. A laser light irradiation system which includes a laser light irradiation apparatus which adjusts a focal length by a focal length adjustment unit in response to a distance from a light source to a light irradiation position in a recording medium, comprising:
a memory storing computer-readable instructions; and
one or more processors configured to execute the computer-readable instructions such that the one or more processors are configured to
obtain control data which instructs the light irradiation position with a coordinate;
analyze the coordinate of the control data to detect an operation amount and recording a number of times a focal length of the focal length adjustment unit is to be adjusted;
accumulate load value information of the focal length adjustment unit in response to results of comparing a threshold number of times the focal length can be adjusted and the recorded number of times the focal length of the focal length adjustment unit is to be adjusted; and
estimate the life span of the focal length adjustment unit based on the accumulated load value information and the recorded number of times the focal length of the focal length adjustment unit is to be adjusted.

14. A load estimation method which estimates a load applied to a laser light irradiation apparatus, wherein a focal length adjustment unit adjusts a focal length in accordance with a distance from a light source to a distance up to an optical irradiation position in a recording medium, comprising the steps of:
obtaining control data which instructs the light irradiation position with a coordinate;
analyzing the coordinate of the control data to detect an operation amount and recording a number of times a focal length of the focal length adjustment unit is to be adjusted;
accumulating load value information of the focal length adjustment unit in response to results of comparing a threshold number of times the focal length can be adjusted and recorded number of times the focal length of the focal length adjustment unit is to be adjusted; and
estimating the life span of the focal length adjustment unit based on the accumulated load value information and the recorded number of times the focal length of the focal length adjustment unit is to be adjusted.

* * * * *